United States Patent
Kang et al.

(10) Patent No.: US 9,179,351 B2
(45) Date of Patent: Nov. 3, 2015

(54) METHOD AND APPARATUS FOR RECEIVING SIGNAL IN MULTI-NODE SYSTEM

(75) Inventors: Ji Won Kang, Anyang-si (KR); Jin Young Chun, Anyang-si (KR); Ki Tae Kim, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 13/980,488

(22) PCT Filed: Nov. 7, 2011

(86) PCT No.: PCT/KR2011/008411
§ 371 (c)(1),
(2), (4) Date: Jul. 18, 2013

(87) PCT Pub. No.: WO2012/099322
PCT Pub. Date: Jul. 26, 2012

(65) Prior Publication Data
US 2013/0301467 A1 Nov. 14, 2013

Related U.S. Application Data

(60) Provisional application No. 61/434,398, filed on Jan. 19, 2011.

(30) Foreign Application Priority Data

Jun. 13, 2011 (KR) .................. 10-2011-0056675

(51) Int. Cl.
G01R 31/08 (2006.01)
H04W 24/10 (2009.01)
(Continued)

(52) U.S. Cl.
CPC ............... *H04W 24/10* (2013.01); *H04B 7/024* (2013.01); *H04L 5/0023* (2013.01);
(Continued)

(58) Field of Classification Search
CPC ..... H04W 24/10; H04B 7/024; H04L 5/0023; H04L 5/0063; H04L 5/0073; H04L 5/0026; H04L 5/0051; H04L 5/0082; H04L 5/0094; H04L 5/001
See application file for complete search history.

(56) References Cited

U.S. PATENT DOCUMENTS 8,934,911 B2 * 1/2015 Lee ................................ 455/444
2003/0129984 A1 * 7/2003 Dent ............................ 455/446
(Continued)

FOREIGN PATENT DOCUMENTS

CN 101909299 A 12/2010
EP 1 564 906 A2 8/2005

OTHER PUBLICATIONS

Texas Instruments, "Signaling for PDSCH Muting in Rel-10," 3GPP TSG RAN WG1 #62bis, Oct. 11-15, 2010, pp. 1-7, R1-105283.
"3rd Generation Partnership Project; Technical Specification Group Radio Access Network; Evolved Universal Terrestrial Radio Access (E-UTRA); Further advancements for E-UTRA physical layer aspects (Release 9)" 3GPP TR 36.814 V9.0.0 (Mar. 2010), 1-104 Pgs.
(Continued)

*Primary Examiner* — Robert Wilson
(74) *Attorney, Agent, or Firm* — Birch, Stewart, Kolasch & Birch, LLP

(57) ABSTRACT

A method of receiving a signal of a user equipment in a multi-node system including a plurality of nodes and a base station for controlling the plurality of nodes is provided. The method includes: receiving a reference parameter from the base station; and receiving a node-specific signal from at least one node among the plurality of nodes, wherein a virtual cell parameter required for decoding of the node-specific signal is determined based on the reference parameter, and the node-specific signal is identified by each of the plurality of nodes.

11 Claims, 18 Drawing Sheets

(51) Int. Cl.
*H04B 7/02* (2006.01)
*H04L 5/00* (2006.01)

(52) U.S. Cl.
CPC ........... *H04L 5/0035* (2013.01); *H04L 5/0051* (2013.01); *H04L 5/0053* (2013.01); *H04L 5/001* (2013.01); *H04L 5/0026* (2013.01); *H04L 5/0073* (2013.01); *H04L 5/0082* (2013.01); *H04L 5/0094* (2013.01)

(56) References Cited

U.S. PATENT DOCUMENTS

| | | | |
|---|---|---|---|
| 2005/0113112 A1* | 5/2005 | Bolin et al. | 455/456.1 |
| 2008/0200211 A1* | 8/2008 | Hwang et al. | 455/562.1 |
| 2010/0062783 A1* | 3/2010 | Luo et al. | 455/450 |
| 2012/0140660 A1* | 6/2012 | Kang et al. | 370/252 |
| 2013/0301467 A1* | 11/2013 | Kang et al. | 370/252 |
| 2013/0301564 A1* | 11/2013 | Chen et al. | 370/329 |
| 2013/0308542 A1* | 11/2013 | Kang et al. | 370/328 |
| 2014/0003349 A1* | 1/2014 | Kang et al. | 370/328 |

OTHER PUBLICATIONS

Samsung, "Revised SID Proposal: Coordinated Multi-Point Operation for LTE", 3GPP TSG RAN#50, Dec. 7-10, 2010, RP-101425, pp. 1-7.

Samsung, "Discussions on Interpretation of ns for CSI-RS scrambling", 3GPP TSG RAN WG1 Meeting #68bis, R1-121632, Jeju, Korea, Mar. 26-30, 2012, 3 pages.

Catt, "Consistent design of CSI-RS for FDD and TDD", 3GPP TSG RAN WG1 Meeting #58 bis, R1-094137, Miyazaki, Japan, Oct. 12-16, 2009, 3 pages.

Catt, "Interference Measurement over Muted RE", 3GPP TSG RAN WG1 Meeting #63bis, R1-110049, Dublin, Ireland, Jan. 17-21, 2011, 4 pages.

Samsung, "Discussions on CSI-RS for LTE-Advanced", 3GPP TSG RAN WG1 #58, R1-093375, Shenzhen, China, Aug. 24-28, 2009, 5 pages.

Zte, "Measurement of Access Downlink of Type II Relay", TSG-RAN WG1 #57bis, R1-092471, Los Angeles, USA, Jun. 29-Jul. 3, 2009, pp. 1-4.

* cited by examiner

METHOD AND APPARATUS FOR RECEIVING SIGNAL IN MULTI-NODE SYSTEM

CROSS REFERENCE TO RELATED APPLICATIONS

This application is the National Phase of PCT/KR2011/008411 filed on Nov. 7, 2011, which claims priority under 35 U.S.C. 119(e) to U.S. Provisional Application No. 61/434,398 filed on Jan. 19, 2011 and under 35 U.S.C. 119(a) to Patent Application No. 10-2011-0056675 filed in Republic of Korea on Jun. 13, 2011, all of which are hereby expressly incorporated by reference into the present application.

TECHNICAL FIELD

The present invention relates to wireless communications, and more particularly, to a method and apparatus for receiving a signal from each of nodes by a user equipment in a multi-node system.

BACKGROUND ART

A data transfer amount of a wireless network has been rapidly increased in recent years. It is because various devices, e.g., a smart phone, a tablet personal computer (PC), or the like, that require machine-to-machine (M2M) communication and a high data transfer amount have been introduced and propagated. To satisfy the required high data transfer amount, a carrier aggregation (CA) technique, a recognition radio technique, or the like for effectively using more frequency bands, and a multiple antenna technique, a multiple base station cooperation technique, or the like for increasing data capacity within a limited frequency have recently drawn attention.

In addition, the wireless network has been evolved in a direction of increasing density of a node capable of accessing to an area around a user. Herein, the node implies an antenna (or antenna group) which is separated from a distributed antenna system (DAS) by a certain distance or farther. However, the node is not limited to this definition, and thus can also be used in a broader sense. That is, the node may be a pico-cell eNB (PeNB), a home eNB (HeNB), a remote radio head (RRH), a remote radio unit (RRU), a relay, a distributed antenna, etc. From UE perspective, UE may recognize a node in a logical sense, not a physical node itself. UE can recognize a node by the reference or pilot signal that the node transmits. Accordingly, a reference or pilot signal can represent a node no matter how the reference or pilot signal is transmitted physically. Therefore, the terminology 'node' includes logical node as well as physical node.

A wireless communication system having such a node with higher density can provide higher system performance by cooperation between nodes. That is, better system performance can be achieved when one base station controller manages transmission and reception of respective nodes and thus the nodes operate as if they are antennas or an antenna group for one cell, in comparison with a case where the respective nodes operate as an independent base station (BS), advanced BS (ABS), node-B (NB), eNode-B (eNB), access point (AP), etc., and thus do not cooperate with each other. Hereinafter, a wireless communication system including a plurality of nodes is referred to as a multi-node system.

If each node of the multi-node system performs scheduling and handover by having its own identifier (ID), then such a multi-node system can be regarded as a multi-cell system. If each cell (i.e., node) of the multi-cell system has overlaid coverage, such a multi-cell system is called a multi-tier network.

The multi-node system can operate according to two methods, that is, a method 1) in which the multi-node system can be utilized as a multi-cell system by assigning a different cell ID to each node and a method 2) in which all nodes can operate as one cell while operating as a virtual cell by assigning a common cell ID to each node. The virtual cell implies a device which is not recognized as an independent node in a legacy user equipment (UE), but is recognized as an independent node in an advanced UE. For example, a UE that operates based on $3^{rd}$ generation partnership project (3GPP) long term evolution (LTE) can be the legacy UE, and a UE that operates based on an LTE-advanced (A) can be the advanced UE.

In a case where the multi-node system operates according to the method 2) above, the UE has to know a transmission parameter of each virtual cell in order to receive a virtual cell specific signal. A method of directly reporting all transmission parameters of the virtual cell results in significant increase in signaling overhead.

Accordingly, there is a need for a method and apparatus for receiving a virtual cell specific signal by a UE in a multi-node system.

SUMMARY OF INVENTION

Technical Problem

The present invention provides a method and apparatus for receiving a signal in a multi-node system.

Solution to Problem

According to an aspect of the present invention, a method of receiving a signal of a user equipment in a multi-node system including a plurality of nodes and a base station for controlling the plurality of nodes is provided. The method includes: receiving a reference parameter from the base station; and receiving a node-specific signal from at least one node among the plurality of nodes, wherein a virtual cell parameter required for decoding of the node-specific signal is determined based on the reference parameter, and the node-specific signal is identified by each of the plurality of nodes.

In the aforementioned aspect of the present invention, the method further includes decoding the node-specific signal, wherein the node-specific signal is decoded by using each of candidates of the virtual cell parameter which is dependent on the reference parameter.

In addition, the node-specific signal may be a channel status information reference signal (CSI-RS) for measuring a channel state between the at least one node and the base station.

In addition, the virtual cell parameter may include a CSI-RS configuration number and a CSI-RS subframe configuration number of the CSI-RS, and the CSI-RS configuration number may indicate a location in a subframe of a resource element to which the CSI-RS is mapped, and the CSI-RS subframe configuration number indicates a subframe in which the CSI-RS is transmitted.

In addition, the CSI-RS subframe configuration number of the at least one node may be a fixed value which is different by a specific offset from the CSI-RS subframe configuration number of the base station, and the CSI-RS configuration number of the at least one node may be a value increased from the CSI-RS configuration number of the base station on the basis of an index of the at least one node.

In addition, a CSI-RS periodicity of the at least one node may be equal to a CSI-RS periodicity of the base station.

In addition, the CSI-RS configuration number of the at least one node may be equal to the CSI-RS configuration number of the base station, and the CSI-RS subframe configuration number of the at least one node may be a value increased based on an index of the at least one node from the CSI-RS subframe configuration number of the base station.

In addition, the CSI-RS periodicity of the at least one node may be equal to the CSI-RS periodicity of the base station.

In addition, the CSI-RS periodicity of the at least one node may be a multiple of the CSI-RS periodicity of the base station.

In addition, if the node-specific signal is the CSI-RS, the antenna port number of the CSI-RS may be used by increasing the base station's antenna port number included in the reference parameter on the basis of an index of the at least one node.

In addition, the virtual cell parameter may include a virtual cell identifier (ID) used by the at least one node, and the virtual cell ID may be partially identical to a mother cell ID used by the base station.

According to another aspect of the present invention, an apparatus for receiving a signal is provided. The apparatus includes: a radio frequency (RF) unit for transmitting and receiving a radio signal; and a processor coupled to the RF unit, wherein the processor receives a reference parameter from the base station and receives a node-specific signal from at least one node among the plurality of nodes controlled by the base station, and wherein a virtual cell parameter required for decoding of the node-specific signal is determined based on the reference parameter, and the node-specific signal is identified by each of the plurality of nodes.

Advantageous Effects of Invention

A method and apparatus for receiving a virtual cell specific signal by a user equipment in a multi-node system are provided. According to the present invention, a transmission parameter of a virtual cell can be known by a relation determined depending on a transmission parameter of a mother cell. Therefore, when the user equipment knows the transmission parameter of the mother cell, the user equipment can receive the virtual cell specific signal. As a result, signaling overhead for reporting the transmission parameter of the virtual cell is decreased in the multi-node system. In addition, since the user equipment does not have to detect the transmission parameter of the virtual cell by using a blind detection scheme, power consumption can be decreased.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the LTE. The IEEE 802.11m is an evolution of the IEEE 802.16e.

Figure 1:
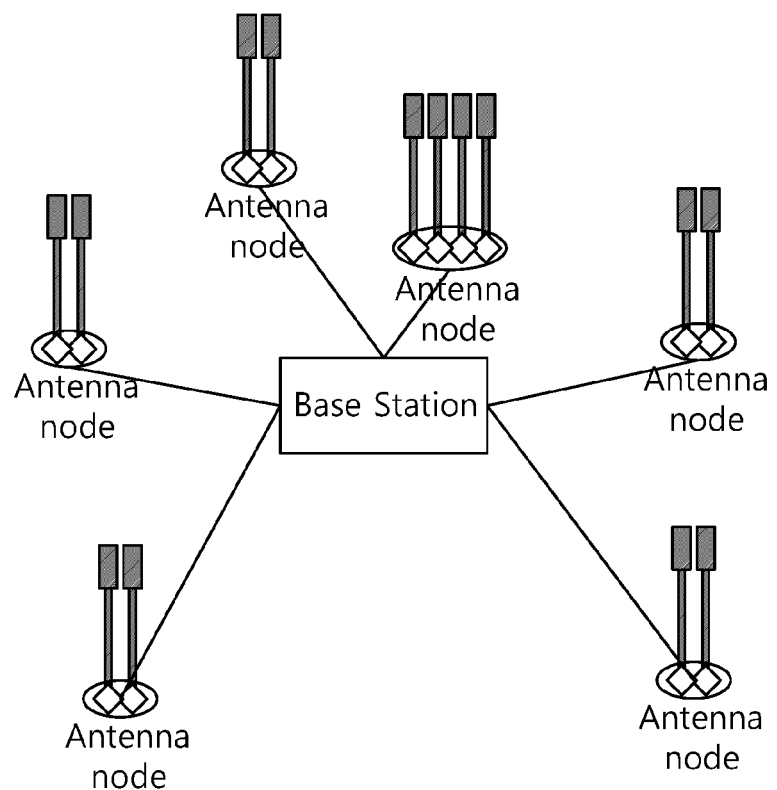
FIG. 1 shows an example of a multi-node system.

FIG. 1 shows an example of a multi-node system.
Referring to FIG. 1, the multi-node system includes a base station (BS, also referred to as eNB) and a plurality of nodes.

In FIG. 1, a node indicated by an antenna node may imply a macro eNB, a pico-cell eNB (PeNB), a home eNB (HeNB), a remote radio head (RRH), a relay, a distributed antenna, etc. Such a node is also referred to as a point.

In the multi-node system, if one BS controller manages transmission or reception of all nodes and thus individual nodes operate as if they are a part of one cell, then the system can be regarded as a distributed antenna system (DAS) which constitutes one cell. In the DAS, separate node identifications (IDs) may be given to the individual nodes, or the individual nodes may operate as if they are some antenna groups within a cell without the additional node IDs. In other words, the DAS is a system in which antennas (i.e., nodes) are deployed in various positions within a cell in a distributed manner, and these antennas are managed by the BS. The DAS is different from a conventional centralized antenna system (CAS) in which antennas of the BS are concentrated in a cell center.

If the individual nodes have separate cell IDs and perform scheduling and handover in the multi-node system, this can be regarded as a multi-cell (e.g., macro-cell/femto-cell/pico-cell) system. If the multiple cells are configured such that they overlap with each other according to coverage, this is called a multi-tier network.

Figure 2:
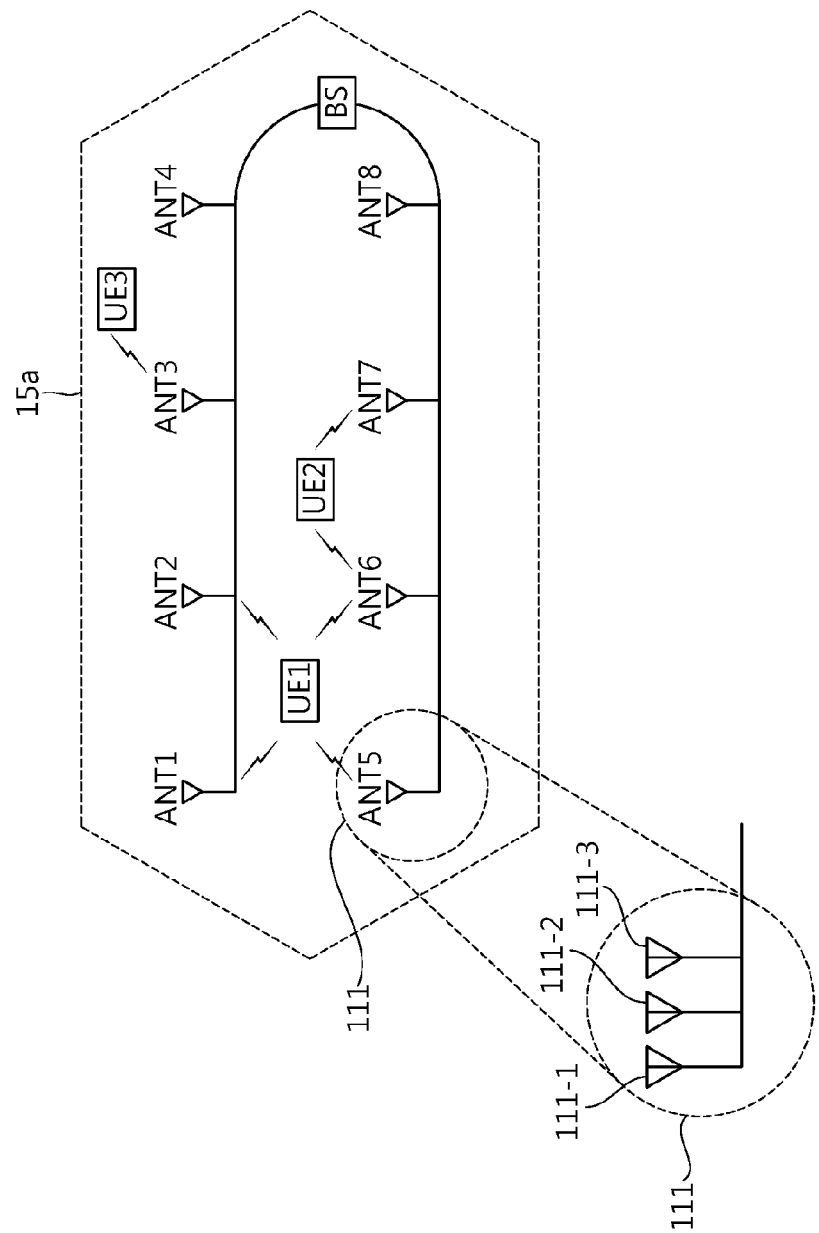
FIG. 2 shows a distributed antenna system (DAS) as an example of a multi-node system.

FIG. 2 shows a DAS as an example of a multi-node system.

Referring to FIG. 2, the DAS includes a BS and a plurality of BS antennas (e.g., ANT 1 to ANT 8, hereinafter a BS antenna is simply referred to as an antenna). The ANT 1 to the ANT 8 can be coupled to the BS in a wired fashion. Unlike the conventional CAS, the DAS has antennas which are deployed in various positions within a cell in a distributed manner instead of being concentrated in a specific position (e.g., a cell center) of a cell 15a. Herein, one antenna may exist in each separate place within a cell (in case of ANTs 1 to 4 and ANTs 6 to 8). In addition, similarly to the ANT 5 (indicated by a reference number 111), several antennas 111-1, 111-2, and 111-3 may exist in a concentrated manner. The antennas which exist in the concentrated manner may constitute one antenna node.

The antennas may be distributed in such a manner that antenna coverage overlaps so that rank 2 (or higher) transmission is possible. That is, antenna coverage of each antenna may reach up to an adjacent antenna. In this case, user equipments (UEs) existing within a cell may receive signals of which strengths change variously according to a location in the call, a channel state, etc., from a plurality of antennas. Referring to the example of FIG. 2, a UE 1 can receive a signal having good signal strength from the ANTs 1, 2, 5, and 6. On the other hand, signals transmitted from the ANTs 3, 4, 7, and 8 may have a negligible effect on the UE 1 due to a path loss.

A UE 2 can receive a signal having good signal strength from the ANTs 6 and 7, and signals transmitted from the remaining antennas may have a negligible effect. Likewise, a UE 3 can receive a signal having good signal strength from only the ANT 3, and signals of the remaining antennas may have negligible weak signal strength.

Due to the aforementioned feature, the DAS may easily perform multiple input multiple output (MIMO) communication with respect to UEs separated from each other within a cell. In the aforementioned example, communication can be performed for the UE 1 through the ANTs 1, 2, 5, and 6, for the UE 2 through the ANT 7, and for the UE 3 through the ANT 3. The ANTs 4 and 8 may transmit signals for the UE 2 or the UE 3, or may transmit no signal. That is, the ANTs 4 and 8 may operate optionally in an off state.

As described above, when MIMO communication is performed in the DAS, the number of layers (i.e., the number of transmission streams) of each UE may be various. In addition, a different antenna (or antenna group) may be allocated to each UE. In other words, the DAS can support a specific antenna (or specific antenna group) for each UE among all antennas in a system. An antenna provided to a UE may vary over time.

Figure 3:
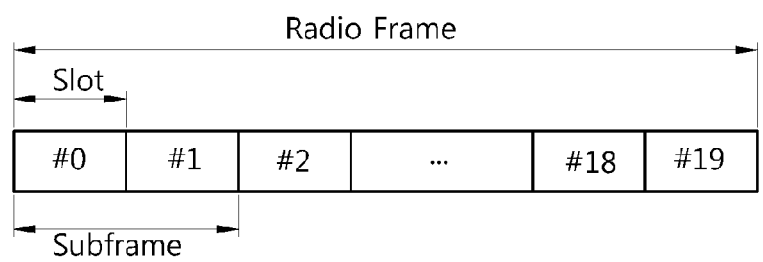
FIG. 3 shows a structure of a frequency division duplex (FDD) radio frame in $3^{rd}$ generation partnership project (3GPP) long term evolution (LTE).

FIG. 3 shows a structure of a frequency division duplex (FDD) radio frame in 3GPP LTE. Such a radio frame structure is called a frame structure type 1.

Referring to FIG. 3, a radio frame includes 10 subframes. One subframe is defined as two consecutive slots. A time required for transmitting one subframe is called a transmission time interval (TTI). A time length of the radio frame is $T_f=307200*T_s=10$ ms, and consists of 20 slots. A time length of the slot is $T_{slot}=15360*T_s=0.5$ ms, and is numbered from 0 to 19. A downlink (DL) in which each node or BS transmits a signal to a UE and an uplink (UL) in which the UE transmits a signal to each node or BS are identified in a frequency domain.

Figure 4:
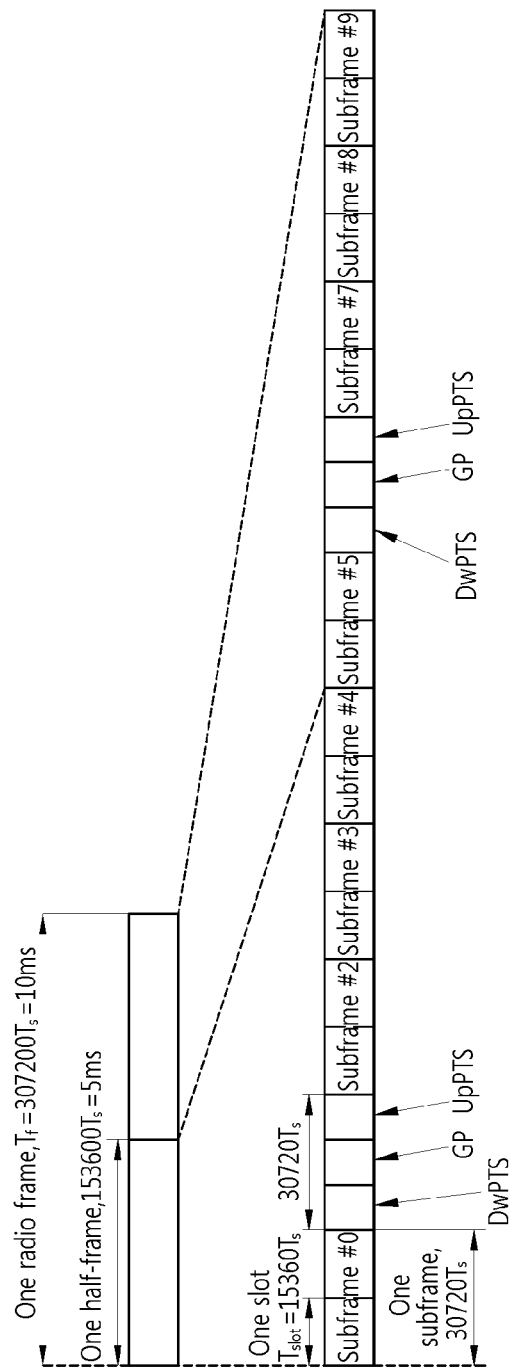
FIG. 4 shows a time division duplex (TDD) radio frame structure in 3GPP LTE.

FIG. 4 shows a time division duplex (TDD) radio frame structure in 3GPP LTE. Such a radio frame structure is called a frame structure type 2.

Referring to FIG. 4, one radio frame has a length of 10 milliseconds (ms), and consists of two half-frames each having a length of 5 ms. One half-frame consists of five subframes each having a length of 1 ms. Each subframe is designated as any one of a UL subframe, a DL subframe, and a special subframe. One radio frame includes at least one UL subframe and at least one DL subframe. One subframe consists of two consecutive slots. For example, one subframe may have a length of 1 ms, and one slot may have a length of 0.5 ms.

The special subframe is a specific period positioned between the UL subframe and the DL subframe for the purpose of UL-DL separation. One radio frame includes at least one special subframe. The special subframe includes a downlink pilot time slot (DwPTS), a guard period (GP), and an uplink pilot time slot (UpPTS). The DwPTS is used for initial cell search, synchronization, or channel estimation. The UpPTS is used for channel estimation in a BS and UL transmission synchronization of a UE. The GP is positioned between the UL time slot and the DL time slot and is used to remove interference that occurs in UL transmission due to a multi-path delay of a DL signal.

In FDD and TDD radio frames, one slot includes a plurality of orthogonal frequency division multiplexing (OFDM) symbols in a time domain and a plurality of resource blocks (RBs) in a frequency domain. Since 3GPP LTE uses OFDMA in DL transmission, the OFDM symbol is for expressing one symbol period, and thus can be referred to as other terms such as an SC-FDMA symbol. The RB is a resource allocation unit, and includes a plurality of consecutive subcarriers in one slot.

The sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)" can be incorporated herein by reference in order to explain the radio frame structure described with reference to FIG. 3 and FIG. 4.

The structure of the radio frame is for exemplary purposes only, and thus the number of subframes included in the radio frame or the number of slots included in the subframe, and the number of OFDM symbols included in the slot may change variously.

Figure 5:
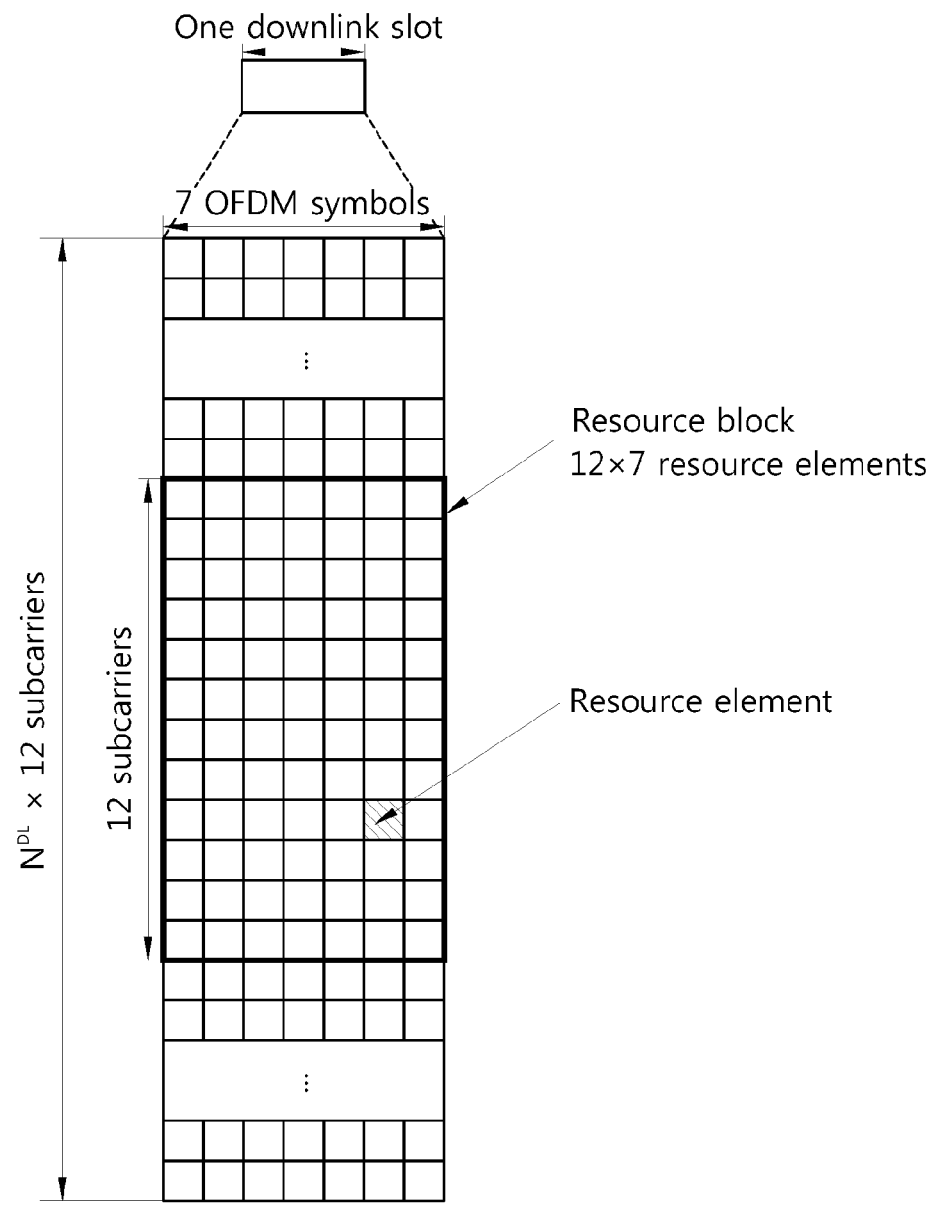
FIG. 5 shows an example of a resource grid for one downlink (DL) slot.

FIG. 5 shows an example of a resource grid for one DL slot.

Referring to FIG. 5, one DL slot includes a plurality of OFDM symbols in a time domain. It is described herein that one DL slot includes 7 OFDMA symbols and one resource block (RB) includes 12 subcarriers in a frequency domain for exemplary purposes only, and the present invention is not limited thereto.

Each element on the resource grid is referred to as a resource element, and one RB includes 127 resource elements. The number $N^{DL}$ of RBs included in the DL slot depends on a DL transmission bandwidth determined in a cell. The aforementioned resource grid for the DL slot can also apply to the UL slot.

Figure 6:
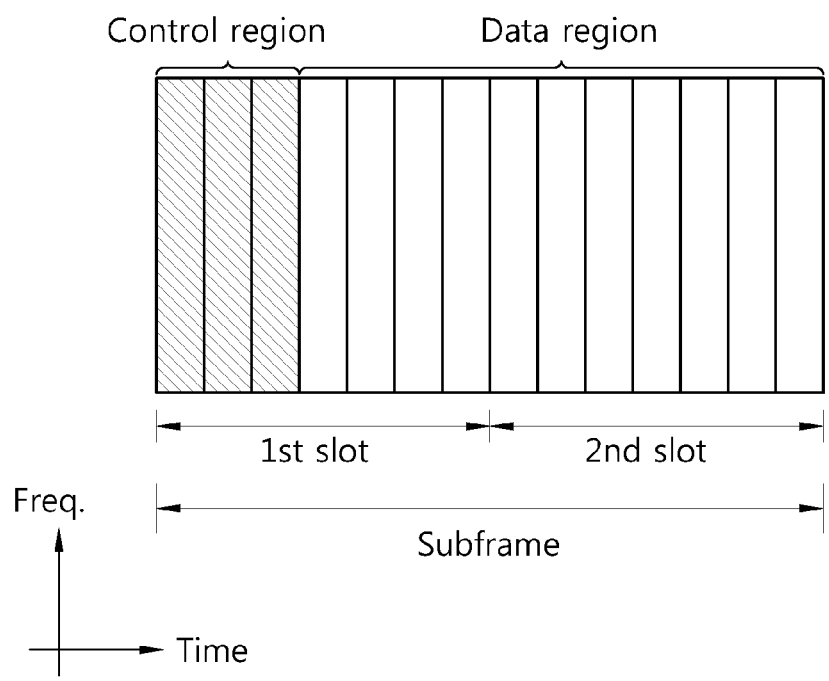
FIG. 6 shows an example of a DL subframe structure.

FIG. 6 shows an example of a DL subframe structure.

Referring to FIG. 6, a subframe includes two consecutive slots. Up to three preceding OFDM symbols of a $1^{st}$ slot in the subframe may correspond to a control region to which control channels are allocated. The remaining OFDM symbols may correspond to a data region to which a physical downlink shared channel (PDSCH) is allocated.

Examples of a DL control channel include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted through the PDCCH is referred to as downlink control information (DCI). The DCI indicates UL resource allocation information, DL resource allocation information, a UL transmit power control command for any UE groups, etc. The PHICH carries an acknowledgement (ACK)/not-acknowledgement (NACK) signal for a UL hybrid automatic repeat request (HARM). That is, the ACK/NACK signal for UL data transmitted by a UE is transmitted through the PHICH.

The PDSCH is a channel for transmitting control information and/or data. The UE may decode the control information transmitted through the PDCCH to read the data transmitted through the PDSCH.

Hereinafter, a method of transmitting a reference signal (RS) in a multi-node system will be described. For convenience of explanation, a method of transmitting an RS in a conventional BS will be first explained. In LTE Rel-8, a cell-specific reference signal (CRS) is used for channel measurement and for channel estimation for a PDSCH.

Figure 7:
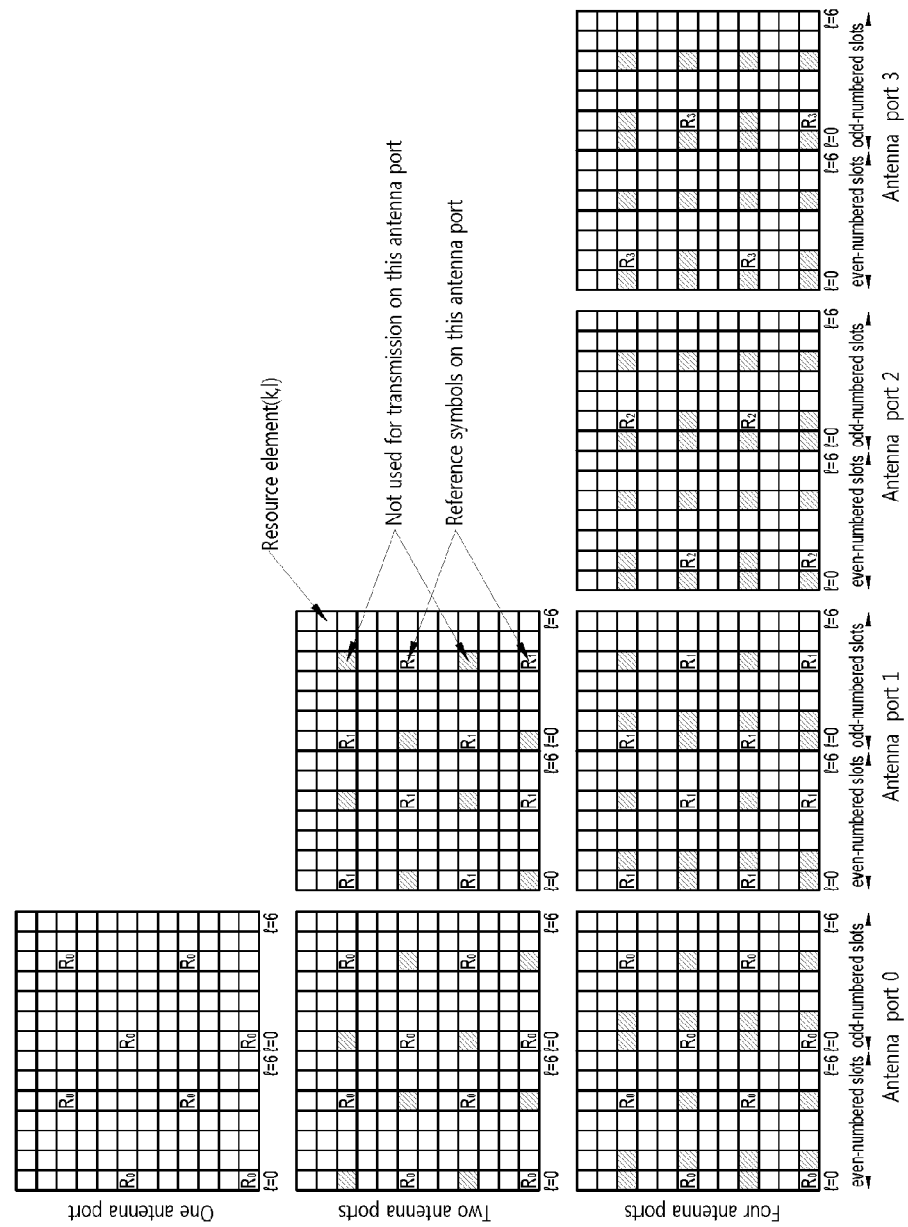
FIG. 7 shows mapping of a cell-specific reference signal (CRS) in a normal cyclic prefix (CP).
Figure 8:
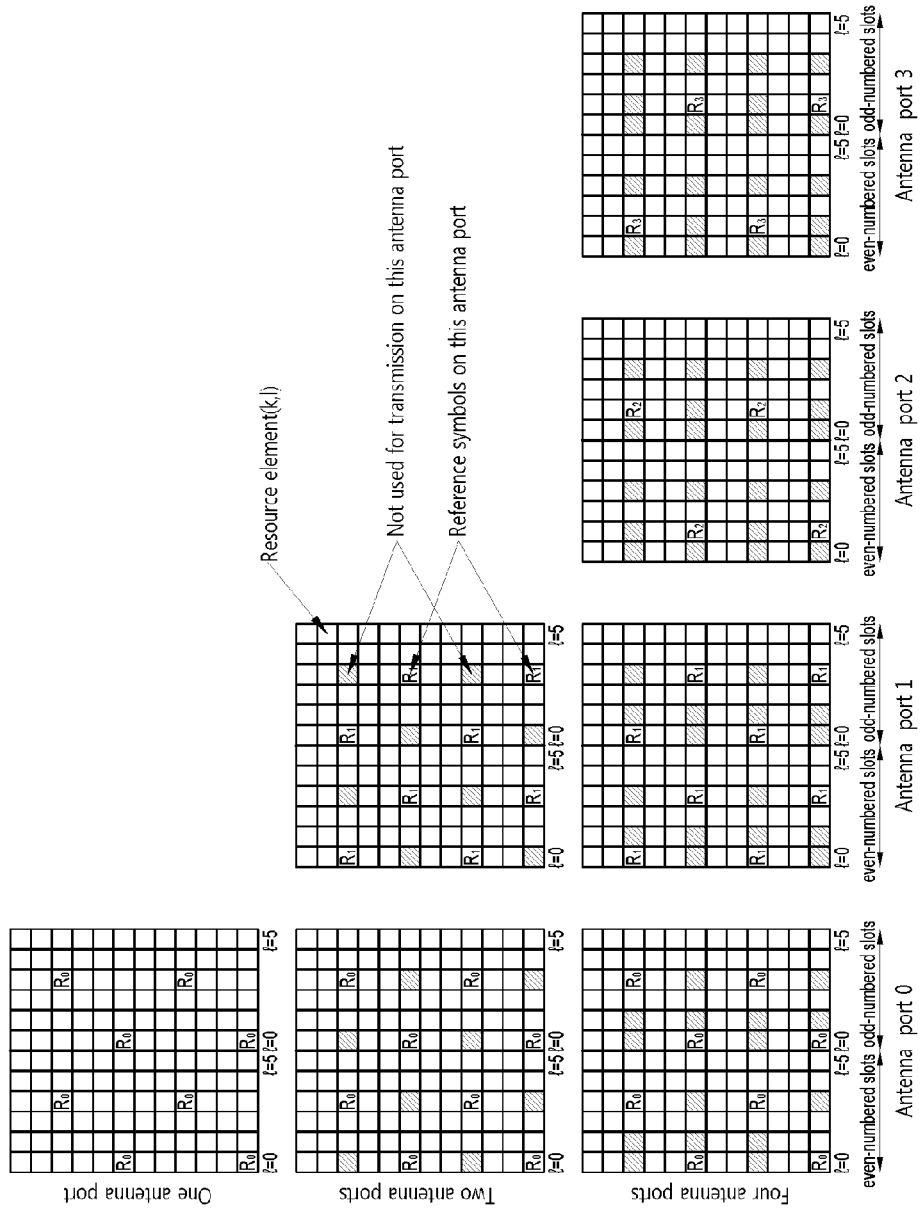
FIG. 8 shows mapping of a CRS in an extended CP.

FIG. 7 shows mapping of a CRS in a normal cyclic prefix (CP). FIG. 8 shows mapping of a CRS in an extended CP.

Referring to FIG. 7 and FIG. 8, in case of multiple antenna transmission using a plurality of antennas, a resource grid exists for each antenna, and at least one RS for each antenna may be mapped to the resource grid. The RS for each antenna consists of reference symbols. Rp denotes a reference symbol of an antenna #p (where p{0, 1, 2, 3}). R0 to R3 are not mapped to overlapping resource elements.

In one OFDM symbols, each Rp may be positioned with a spacing of 6 subcarriers. In a subframe, the number of R0s is equal to the number of R1s, and the number of R2s is equal to the number of R3s. In the subframe, the number of R2s and R3s is less than the number of R0s and R1s. Rp is not used in any transmission through antennas except for the antenna #p.

In LTE-A, in addition to the CRS, a channel status information reference signal (CSI-RS) can be used for channel measurement and for channel estimation for a PDSCH. Hereinafter, the CSI-RS will be described.

Unlike the CRS, the CSI-RS has up to 32 different configurations in order to decrease inter-cell interference (ICI) in a multi-cell environment including a heterogeneous network environment.

The configuration for the CSI-RS differs depending on the number of antenna ports in a cell, and is given between neighboring cells as much different as possible. The CSI-RS is identified according to a CP type. According to a frame structure type (i.e., FDD for a frame structure type 1 and TDD for a frame structure type 2), the CSI-RS may be configured such that it applies both to the frame structure type 1 and the frame structure type 2, or may be configured such that it applies only to the frame structure type 2.

Unlike the CRS, the CSI-RS supports up to 8 antenna ports. $\{15\}$, $\{15, 16\}$, $\{15, 16, 17, 18\}$, and $\{15, \ldots, 22\}$ are supported in an antenna port p. That is, one, two, four, and eight antenna ports are supported. A subcarrier spacing f is defined only for 15 kHz.

A sequence $r_{l,n_s}(m)$ for the CSI-RS is generated by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad [\text{Equation 1}]$$

$$m = 0, 1, \ldots, N_{RB}^{max,DL} - 1$$

where, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 1 above, $n_s$ denotes the number of slots in a radio frame, and l denotes the number of OFDM symbols in a slot. c(i) denotes a pseudo random sequence, and starts with $c_{init}$ in each OFDM symbol. $N_{ID}^{cell}$ denotes a physical layer cell ID.

In subframes configured to transmit the CSI-RS, the RS sequence $r_{l,n_s}(m)$ is mapped to a complex-valued modulation symbol $a_{k,l}^{(p)}$ used as a reference symbol for the antenna port p.

$r_{l,n_s}(m)$ and $a_{k,l}^{(p)}$ are related by Equation 2 below.

$$a_{k,l}^{(p)} = w_{l''} \cdot r_{l,n_s}(m') \quad [\text{Equation 2}]$$

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & CSI \text{ reference signal configurations } 0\text{-}19, \text{ normal cyclic prefix} \\ 2l'' & CSI \text{ reference signal configurations } 20\text{-}31, \text{ normal cyclic prefix} \\ l'' & CSI \text{ reference signal configurations } 0\text{-}27, \text{ extended cyclic prefix} \end{cases}$$

-continued $$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2 above, (k', l') and $n_s$ are given in Table 1 and Table 2 below. The CSI-RS can be transmitted in a DL slot satisfying the conditions of Table 1 and Table 2 below (herein, 'mod' denotes a modular operation, that is, denotes a remainder obtained by dividing $n_s$ by 2).

Table 1 below shows a CSI-RS configuration in case of a normal CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 2 below shows a CSI-RS configuration in case of an extended CP.

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |

TABLE 2-continued

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame | 16 | (11, 1) | 1 | (11, 1) | 1 | (11, 1) | 1 |
| structure | 17 | (10, 1) | 1 | (10, 1) | 1 | (10, 1) | 1 |
| type 2 only | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

In addition, the CSI-RS can be transmitted in a subframe satisfying the condition of Table 3 below.

That is, a subframe including the CSI-RS must satisfy Equation 3 below.

$$(10n_f + \lfloor n_s/2 \rfloor - \Delta_{CSI-RS}) \mod T_{CSI-RS} = 0 \quad \text{[Equation 3]}$$

In Equation 3 above, $T_{CSI-RS}$ denotes a cell-specific period of the CSI-RS. $\Delta_{CSI-RS}$ denotes a cell-specific subframe offset of the CSI-RS. $n_f$ denotes a system frame number.

Table 3 below a CSI-RS subframe configuration related to a CSI-RS periodicity and a transmission time.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

In Table 3 above, 'CSI-RS-SubframeConfig' (i.e., $I_{CSI-RS}$) is a value given by a higher layer and denotes a CSI-RS subframe configuration number. That is, in the CSI-RS, a CSI-RS periodicity $T_{CSI-RS}$ and a CSI-RS subframe offset $\Delta_{CSI-RS}$ are determined according to the CSI-RS subframe configuration number. The CSI-RS supports 5 types of CSI-RS periodicities according to a CQI/CSI feedback, and can be transmitted with a different CSI-RS subframe offset in each cell.

Figure 9:
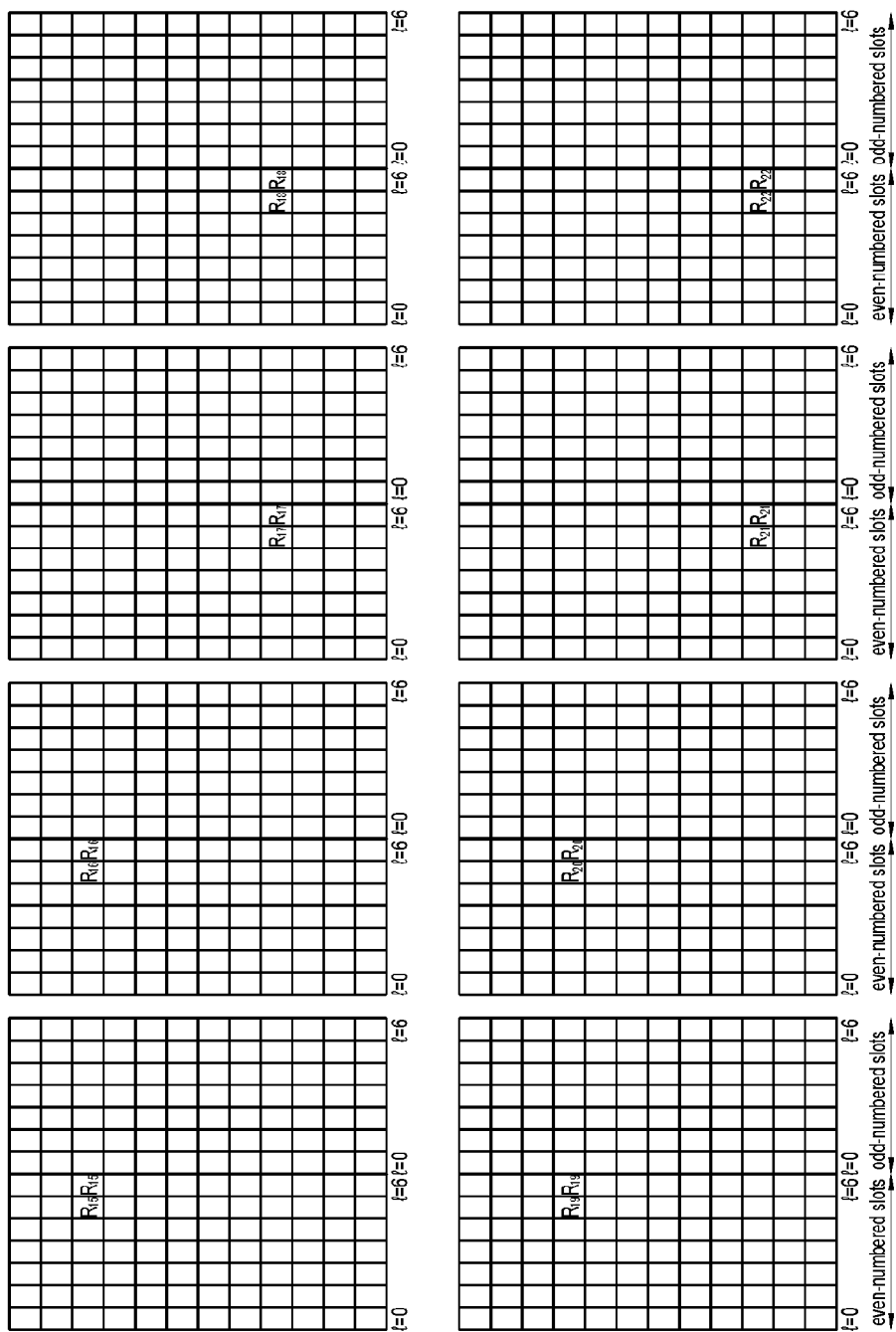
FIG. 9 shows mapping of a channel status information reference signal (CSI-RS) for a CSI configuration number 0 in a normal CP.
Figure 10:
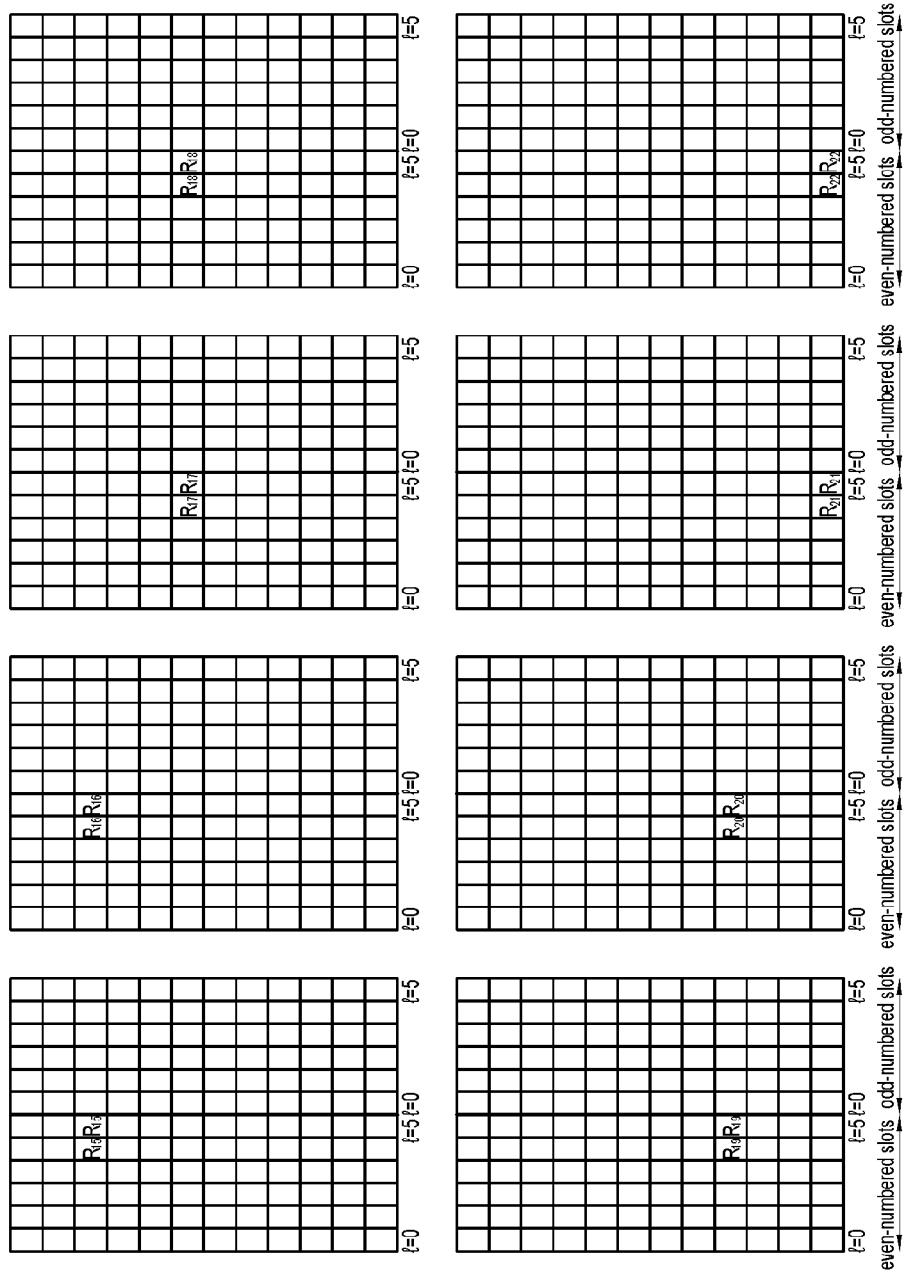
FIG. 10 shows mapping of a CSI-RS for a CSI configuration number 0 in an extended CP.

FIG. 9 shows mapping of a CSI-RS for a CSI configuration number 0 in a normal CP. FIG. 10 shows mapping of a CSI-RS for a CSI configuration number 0 in an extended CP.

Referring to FIG. 9 and FIG. 10, the CSI-RS is transmitted by using identical two consecutive resource elements with respect to two antenna ports, e.g., p={15, 16}, {17, 18}, {19, 20}, {21, 22}. In this case, an orthogonal cover code (OCC) is used in transmission. That is, the CSI-RS is transmitted by using the same resource elements for the two antenna ports, and the CSI-RS for each antenna port is identified by the OCC.

A plurality of CSI-RS configurations can be used in a given cell. In this case, one CSI-RS configuration in which a UE assumes non-zero transmission power may be present, and one or more (or none) CSI-RS configurations in which the UE assumes zero transmission power may be present.

The CSI-RS is not transmitted in the following cases.

1. A special subframe in a frame structure type 2.
2. When collision occurs with a synchronization signal, a physical broadcast channel (PBCH), and a system information block (SIB).
3. A subframe in which a paging message is transmitted.

A resource element (k,l) used to transmit an CSI-RS for any antenna port of a set S is not used to transmit a PDSCH for any antenna port in the same slot. Herein, antenna ports included in the set S are {15, 16}, {17, 18}, {19, 20}, and {21, 22}. In addition, the resource element (k,l) is not used to transmit a CSI-RS for any other antenna ports except for the set S in the same slot.

Parameters required for transmission of the aforementioned CSI-RS include: 1) the number of CSI-RS ports; 2) a CSI-RS configuration number indicating a CSI-RS configuration; and 3) a CSI-RS subframe configuration number (i.e., $I_{CSI-RS}$) indicating a transmission period and time of the CSI-RS. These parameters are cell- or UE-specific parameters, and can be given by using higher layer signaling. The aforementioned RS (e.g., CRS, CSI-RS, etc.) can be applied such that a UE can identify each node in a multi-node system.

Hereinafter, a method and apparatus for receiving a signal from a virtual cell by a UE in a multi-node system including the virtual cell will be described.

Figure 11:
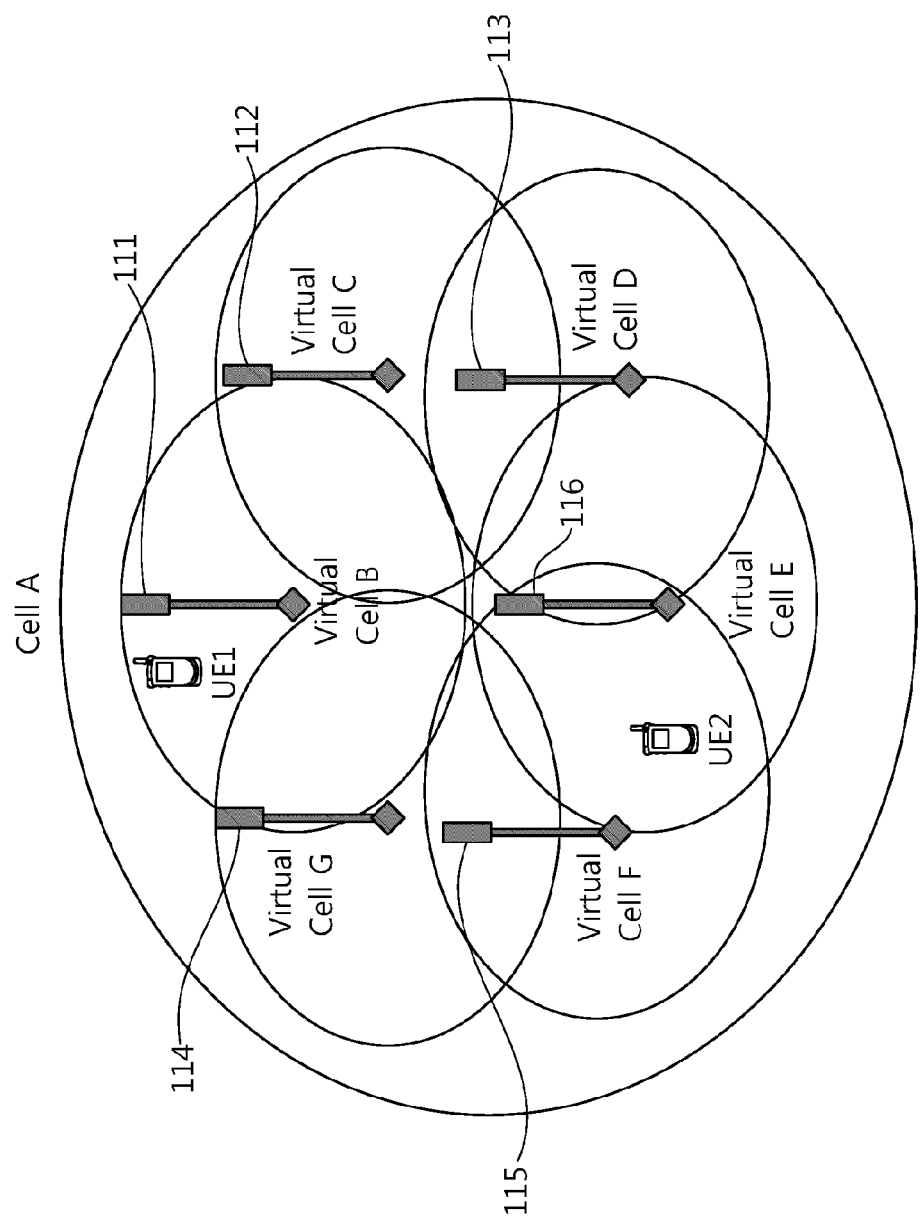
FIG. 11 shows an example of a multi-node system including a virtual cell.

FIG. 11 shows an example of a multi-node system including a virtual cell.

Referring to FIG. 11, the multi-node system has a plurality of nodes 111 to 116 coupled to one BS (not shown). The plurality of nodes are arranged in a distributed manner. An example of the node includes a remote radio head (RRH), a remote radio unit (RRU), an access point, an antenna, an antenna node, an antenna group, etc. In order to effectively use the multi-node system, it is preferable that the plurality of nodes operate as one cell while operating as the virtual cell.

Herein, the virtual cell denotes a cell which is not recognized as an independent cell or antenna in a legacy UE, but is recognized as the independent cell or antenna in an advanced UE. For example, a UE operating based on 3GPP LTE may be the legacy UE, or a UE operating based on LTE-A may be the advanced UE. A cell recognized by the legacy UE is referred to as a mother cell. In FIG. 11, a cell A may be the mother cell. The mother cell may be a cell supported by the BS. The advanced UE can recognize both the mother cell and the virtual cell.

The node that operates as the virtual cell transmits a synchronization signal (SS) based on a cell ID of the mother cell. In addition, the node that operates as the virtual cell transmits a virtual cell specific signal that can be recognized by the advanced UE. The virtual cell specific signal may be, for example, a pilot signal (e.g., CSI-RS, positioning reference signal (PRS), etc.) or a new SS that cannot be recognized by the legacy UE.

The advanced UE may recognize virtual cells as a collaboration cell in inter-cell collaboration communication such as coordinated multi-point (CoMP), enhanced inter-cell interference coordination (eICIC), etc., or may recognize the virtual cells as an antenna (port) within a cell that performs collaboration transmission between antennas, i.e., multi-input multi-output (MIMO) transmission.

The multi-node system including the virtual cell can be implemented such that a node having high transmission power at a cell center constitutes the mother cell that covers the entire cell, and nodes having lower transmission power in the mother cell constitute the virtual cells. Alternatively, it can be implemented such that all nodes in a cell constitute one mother cell so as to transmit the same signal, and nodes having low transmission power in the mother cell constitute the virtual cells. Alternatively, it can be implemented such that each of the nodes having low transmission power constitutes one virtual cell, while a plurality of neighboring nodes constitute one virtual cell altogether.

The multi-node system including the virtual cell is hereinafter referred to as a virtual cell system. In order for an advanced UE in the virtual cell system to recognize a virtual cell specific signal, it is preferable to know a property of virtual cells in the mother cell. If the advanced UE is totally unaware of the property of the virtual cell, the UE has to perform blind detection on all parameters for the virtual cell specific signal. The blind detection is a process in which decoding is performed by assuming each transmission parameter to a specific value and correct decoding is determined upon detection of no error. Therefore, the blind detection requires great computational ability and causes increase in power consumption.

Examples of the parameter for the virtual cell specific signal are various such as a cell ID used by the virtual cell specific signal, the number of antenna ports, an antenna port number, a reference signal configuration number, a reference signal subframe configuration number, etc. It is undesirable for the UE to perform blind detection on such various parameters since it causes increase in power consumption.

In order to solve such a problem, the BS can report all parameter information for virtual cell specific signals in the mother cell to the advanced UE. That is, the mother cell can report to the UE the parameters such as the cell ID for virtual cells, the number of antenna ports, the antenna port number, the reference signal configuration number, the reference signal subframe configuration number, etc.

The virtual cell specific parameter can be transmitted by using a higher layer signal such as a radio resource control (RRC) message. That is, the virtual cell specific parameter can be reported by being defined as a new information element (IE) of RRC, or can be reported by being included in a conventional IE. For example, in LTE, the cell ID of the virtual cell can be reported by being included in a neighbor cell list, and can be transmitted by adding information such as a CSI-RS configuration number for the virtual cell, the number of antenna ports, etc., to 'NeighCellConfig IE'. Alternatively, some of the virtual cell specific parameters can be reported to the UE by being included in 'CSI-RS-Config IE'.

Table 4 below shows an example of CSI-RS-Config IE.

TABLE 4

```
-- ASN1START
CSI-RS-Config-r10 ::=    SEQUENCE {
    csi-RS-r10                CHOICE {
        release               NULL,
        setup                 SEQUENCE {
            antennaPortsCount-r10    ENUMERATED {an1, an2, an4, an8},
            resourceConfig-r10       INTEGER (0..31),
            subframeConfig-r10       INTEGER (0..154),
            p-C-r10                  INTEGER (-8..15)
        }
    }                                               OPTIONAL,  -- Need ON
    zeroTxPowerCSI-RS-r10    CHOICE {
        release               NULL,
        setup                 SEQUENCE {
            zeroTxPowerResourceConfigList-r10    BIT STRING (SIZE (16)),
            zeroTxPowerSubframeConfig-r10        INTEGER (0..154)
        }
    }                                               OPTIONAL  -- Need ON
}
-- ASN1STOP
```

In Table 4 above, 'antennaPortsCount' denotes the number of antenna ports used for CSI-RS transmission. 'resourceConfig' denotes a parameter indicating a CSI-RS configuration, and 'subframeConfig' indicates $I_{CSI-RS}$ 'zeroTxPowerResourceConfigList' and 'zeroTxPowerSubframeConfig' are parameters related to configuration of a CSI-RS having zero transmission power. The CSI-RS-Config IE can be transmitted by including the virtual cell specific parameter. For example, information indicating a specific number of virtual cells and indicating a specific method can be included in 'CSI-RS-Config IE', wherein all 'antennaPortsCount' CSI-RS ports are transmitted by being divided according to the specific method by the specific number of virtual cells. That is, the number of virtual cells which share the same number of CSI-RS configurations and/or mapping information between the virtual cells and the CSI-RS port number can be included.

As described above, in a case where the mother cell reports all parameters for the virtual cell specific signal, i.e., configuration information, to the UE, if a plurality of virtual cells are present or many parameters have to be added, then signaling overhead can be significantly increased.

In addition, the UE may have to feed back not only L2 and/or L3 measurement values (e.g., channel quality indicator (CQI), reference signal received power (RSRP), and reference signal received quality (RSRQ)) but also parameters for the measured virtual cell (e.g., cell ID, antenna port number, and reference signal configuration number). In this case, a problem arises in that feedback signaling overhead increases in proportional to the increase in a range of a parameter candidate of the virtual cell.

Therefore, there is a need for a method and apparatus for effectively receiving a signal of a virtual cell by a UE by reporting a parameter for the virtual cell to the UE while avoiding excessive increase of signaling overhead.

A virtual cell parameter is a parameter that can have a different value for each virtual cell, that is, a virtual cell specific parameter. The virtual cell parameter may be, for example, a cell ID of the virtual cell, the number of antenna ports, an antenna port number, reference signal configuration information (e.g., a CSI-RS configuration number and a CSI-RS subframe configuration number), etc. The virtual cell parameter can be determined depending on a parameter of the mother cell. For example, the number of antenna ports of the virtual cell may be equal to the number of antenna ports of the mother cell. Then, the number of antenna ports for the virtual cell can be omitted when the virtual cell specific parameter is transmitted. Alternatively, since the UE knows the number of antenna ports for the virtual cell by using the parameter of the mother cell when performing blind detection on the virtual cell specific signal, detection overhead can be reduced.

If the UE can know the virtual cell parameter on the basis of the parameter of the mother cell, there is an advantage in that signaling overhead of the virtual cell system can be decreased, and when the UE performs blind detection on the virtual cell specific signal, a computation speed can be increased and power consumption can be reduced.

Figure 12:
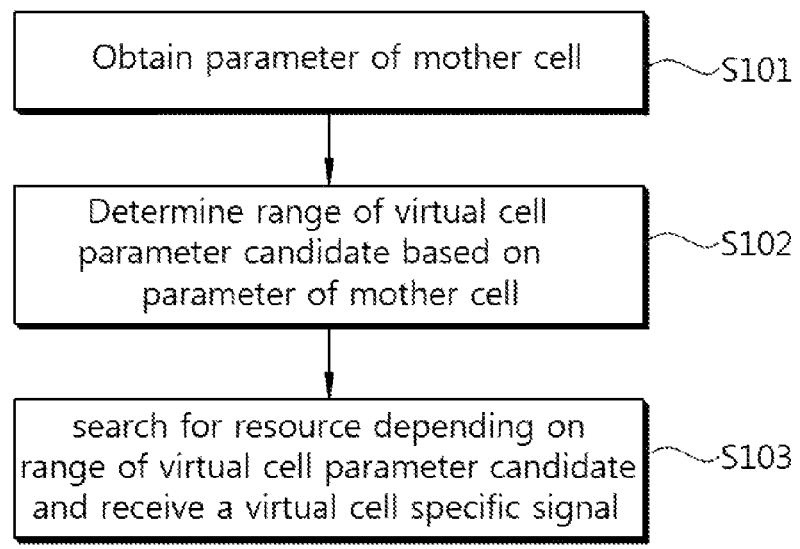
FIG. 12 is a flowchart showing a method of receiving a signal of a virtual cell by a user equipment according to an embodiment of the present invention.

FIG. 12 is a flowchart showing a method of receiving a signal of a virtual cell by a UE according to an embodiment of the present invention.

Referring to FIG. 12, the UE obtains a parameter of a mother cell (step S101). For example, the UE can obtain the parameter of the mother cell by using a mother cell specific broadcast message or signal. The mother cell specific broadcast message or signal may be, for example, a system information block (SIB), a synchronization signal, a cell-specific reference signal (CRS), etc.

The UE determines a range of a virtual cell parameter candidate on the basis of the parameter of the mother cell (step S102).

The UE searches for a resource depending on the range of the virtual cell parameter candidate and receives a virtual cell specific signal (step S103).

Although an example of determining the virtual cell parameter on the basis of the parameter of the mother cell is described herein, the present invention is not limited thereto. That is, the virtual cell parameter can be determined based on a reference parameter. The reference parameter may be a specific value which is designated to the UE by the BS or which is determined by a standard, or which is a parameter value of the mother cell. That is, an example of the reference parameter is shown in FIG. 12 in which the reference parameter is the parameter of the mother cell.

The virtual cell specific signal may be, for example, a CSI-RS transmitted by the virtual cell. Then, the virtual cell parameter may be a CSI-RS configuration number for the CSI-RS transmitted by the virtual cell, a CSI-RS subframe configuration number, etc. In addition, the reference parameter may be, for example, a parameter of a zero-power CSI-RS designated to an advanced UE by the BS. This is because the virtual cell specific CSI-RS transmitted to the advanced UE can be transmitted on a resource element designated by a parameter of the zero-power CSI-RS.

As such, blind detection performed on the virtual cell specific signal in a state where some of virtual cell parameters are known and the remaining virtual cell parameters are unknown can be referred to as semi-blind detection (SBD).

The SBD method has at least two advantages. First, the UE can detect the virtual cell specific signal while having lower detection overhead. Second, a required computational speed and power consumption of the UE are reduced.

Hereinafter, a method of determining a virtual cell parameter on the basis of a reference parameter (e.g., a parameter of a mother cell) will be described. Although a cell ID of a virtual cell, CSI-RS configuration information, etc., are described as an example of the virtual cell parameter, the present invention is not limited thereto.

Embodiment 1

Cell ID of Virtual Cell

It is assumed that virtual cell specific signals use different cell IDs. The total number of available cell IDs of a mother cell (referred to as a candidate) can be determined depending on a system. For example, in case of LTE, the number of candidates of the cell ID of the mother cell may be 504, and in case of IEEE 802.16, the number of candidates may be 768. If an information amount for expressing the cell ID is converted in a bit format, it is expressed by 9 bits in LTE and 10 bits in IEEE 802.16. In this case, if it is defined such that some bits of the cell ID of the virtual cell are equal to those of the cell ID of the mother cell, then an information amount for delivering the cell ID of the virtual cell is decreased.

For example, it can be defined such that a seed number that constitutes the cell ID in a synchronization signal transmitted by the virtual cell are partially identical to a seed number that constitutes the cell ID of the mother cell. For example, in LTE, a cell ID (i.e., $N_{ID}^{cell}$) is defined as $N_{ID}^{cell} = 3 N_{ID}^{(1)} + N_{ID}^{(2)}$. Herein, $N_{ID}^{(1)}$ denotes a cell ID group, and may be any one of values 0 to 167. $N_{ID}^{(2)}$ denotes a cell ID in a cell ID group, and may be any one of values 0 to 2. In this case, $N_{ID}^{(1)}$ is expressed with 8 bits, and $N_{ID}^{(2)}$ is expressed with 2 bits. A cell ID allocated to virtual cells that exist in the same mother cell can be defined such that some bits thereof are equal to those of the aforementioned $N_{ID}^{(1)}$ and/or $N_{ID}^{(2)}$. For example, all nodes coupled to the same BS may have the same $N_{ID}^{(1)}$. Then, each node can be identified by $N_{ID}^{(2)}$.

A cell ID used by a virtual cell specific signal can be defined such that some bits of a cell ID of the mother cell are equal to those of $N_{ID}^{(1)}$ and/or $N_{ID}^{(2)}$. For example, if it is defined that $N_{ID}^{(2)}$ is identical, the UE can know that $N_{ID}^{(2)}$ obtained from a primary synchronization signal (PSS) is also identical in the virtual cell. Therefore, regarding the virtual cell, only $N_{ID}^{(1)}$ can be used in signaling. Alternatively, it is enough for the UE to search for only $N_{ID}^{(1)}$ in a semi-blind detection (SBD) procedure.

Although the aforementioned example is related to LTE, the same is also applicable to IEEE 802.16. In IEEE 802.16m, a preamble takes a role of the aforementioned synchronization signal. There are two types of preambles in IEEE 802.16m (the preamble is referred as an advanced preamble (AP) in IEEE 802.16m). That is, the two types of preambles are a primary AP (hereinafter, PA-preamble) and a secondary AP (hereinafter, SA-preamble). One PA-preamble symbol and two SA-preamble symbols are present in a superframe. An AP symbol may be located in a first symbol of a frame other than a last frame. For example, the PA-preamble is located in a first symbol of a second frame in the superframe, and the SA-preamble is located in a first symbol of first and third frames.

A sequence for the PA-preamble has a length of 216 irrespective of a fast Fourier transform (FFT) size. The PA-preamble carries information regarding a system bandwidth and a carrier configuration. If a subcarrier index 256 is reserved for a DC subcarrier, subcarrier allocation is performed according to Equation 4 below.

PAPreambleCarrierSet=2·k+41 [Equation 4]

In Equation 4 above, 'PAPreambleCarrierSet' specifies all subcarriers allocated to the PA-preamble. Further, k denotes a running index in the range of 0 to 215.

The number $N_{SAP}$ of subcarriers allocated for the SA-preamble is 144, 288, and 576 respectively for 512-FFT, 1024-FFT, and 2048-FFT. Subcarrier allocation is performed according to Equation 5 below. Subcarrier indices 256, 512, and 1024 are reserved for a DC subcarrier respectively for 512-FFT, 1024-FFT, and 2048-FFT.

$$SAPreambleCarrierSet_n = n + 3 \cdot k + 40 \cdot \frac{N_{SAP}}{144} + \left\lfloor \frac{2 \cdot k}{N_{SAP}} \right\rfloor$$ [Equation 5]

In Equation 5 above, 'SAPreambleCarrierSet$_n$' specifies all subcarriers allocated to the specific SA-preamble. n denotes a segment ID as an index of an SA-preamble carrier set 0, 1, and 2, and k denotes an index in the range of 0 to ($N_{SAP}$−1) with respect to each FFT size.

Each segment uses an SA-preamble configured with one carrier set among 3 types of available carrier sets. For example, a segment 0 uses an SA-preamble carrier set 0, a segment 1 uses an SA-preamble carrier set 1, and a segment 2 uses an SA-preamble carrier set 2.

In IEEE 802.16m, each cell ID has an integer value in the range of 0 to 767. A cell ID 'IDcell' is defined with a segment ID and an index for each segment according to Equation 6 below.

IDcell=256n+Idx [Equation 6]

In Equation 6 above, n denotes a segment ID as an index of SA-preamble carrier sets 0, 1, and 2. Idx of Equation 6 above is given by Equation 7 below.

Idx=2 mod($q$,128)+$\lfloor q/128 \rfloor$, $q$ is a running index 0 to 255. [Equation 7]

As described above, the UE that operates based on the IEEE 802.16m uses a preamble to obtain a cell ID. Therefore, the cell ID used by the virtual cell specific signal can be defined such that the indices n and Idx are partially identical to those of the mother cell.

Alternatively, a part of information of the cell ID of the virtual cell can be defined to a specific value, e.g., a predetermined value. That is, regarding the virtual cell, a fixed value (e.g., 0) is used for a part of information that constitutes the cell ID. Then, a range of the cell ID of the virtual cell is decreased in comparison with a range of a cell ID of the mother cell. When mother cells including virtual cells are neighboring to each other, this method may have a problem in that virtual cells of different mother cells have the same cell ID. The presence of virtual cells having the same cell ID may result in increase of interference, CQI mismatch, etc. Therefore, the aforementioned method, that is, the method of specifying a part of information of the cell ID of the virtual cell to a specific value, can be selectively used according to a system characteristic.

Embodiment 2

CSI-RS Configuration Information of Virtual Cell

A virtual cell specific signal may be a CSI-RS in LTE. A resource transmitted by using the CSI-RS can be determined by a CSI-RS configuration number and a CSI-RS subframe configuration number. A UE can know a resource element (RE) on which the CSI-RS is transmitted (mapped) in a subframe by the CSI-RS configuration number, and can know a period and offset, i.e., a CSI-RS transmission time (i.e., a subframe), according to which the CSI-RS is transmitted by using the CSI-RS subframe configuration number.

Figure 13:
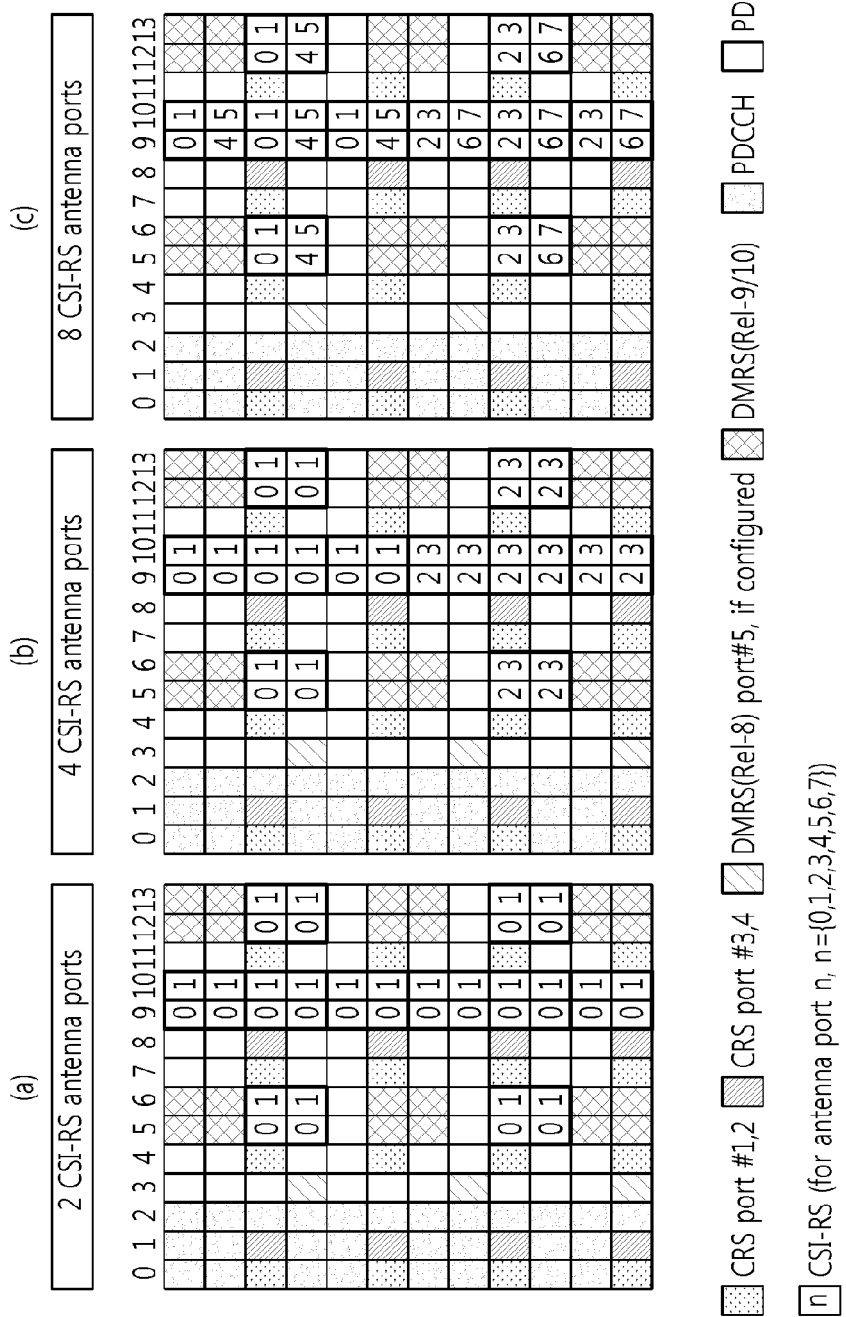
FIG. 13 and FIG. 14 show positions of all resource elements on which a CSI-RS can be transmitted in LTE and which are displayed on two consecutive resource blocks.
Figure 14:
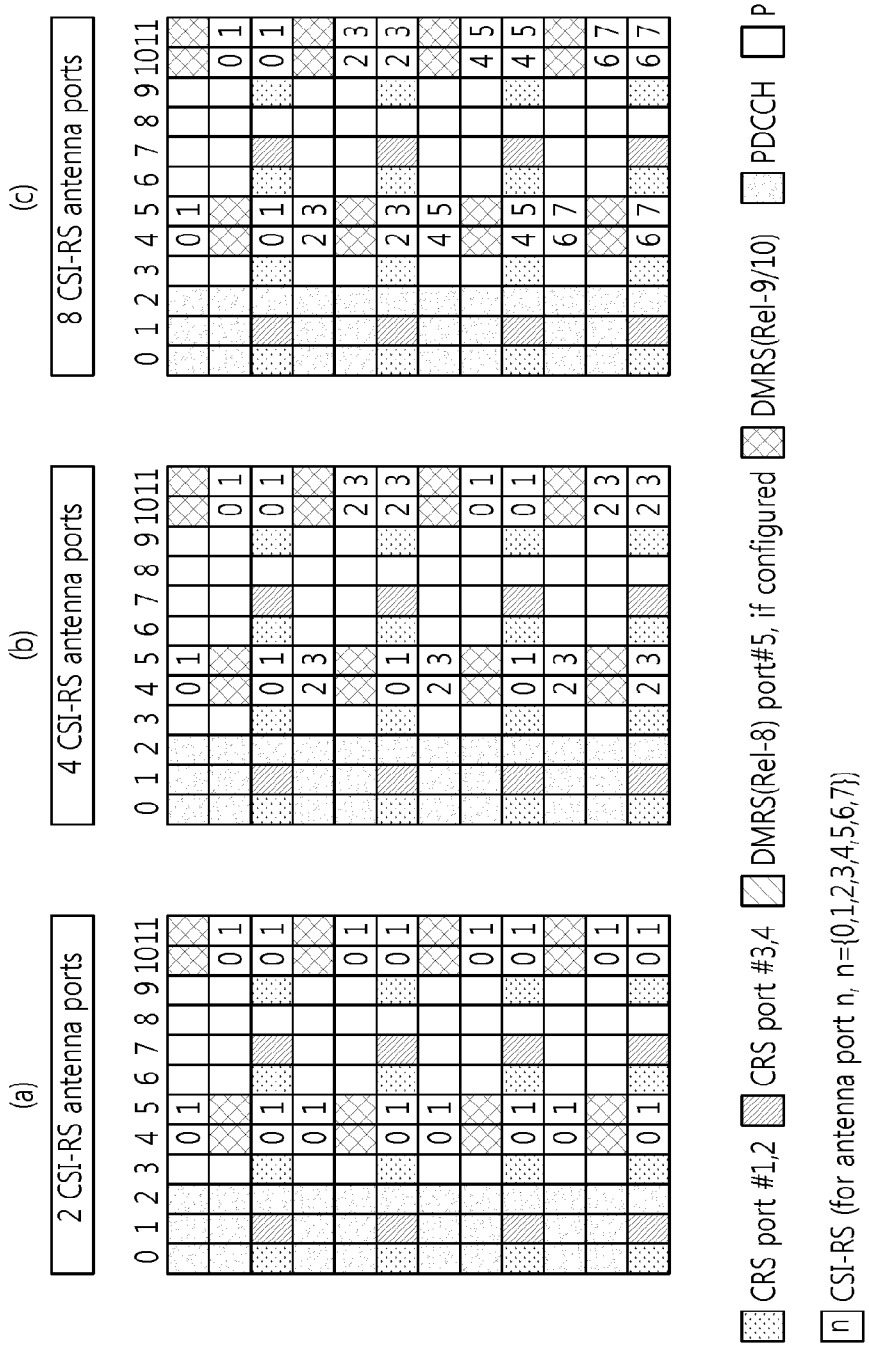

FIG. 13 and FIG. 14 show positions of all resource elements on which the CSI-RS can be transmitted in LTE and which are displayed on two consecutive resource blocks. That is, in FIG. 13 and FIG. 14, all resource elements corresponding to the CSI-RS subframe configuration number described in Table 1 (in case of a normal CP) and Table 2 (in case of an extended CP) are expressed on two consecutive resource blocks.

Referring to FIG. 13 (a) and FIG. 14 (a), when using two antenna ports, two consecutive resource elements indicated by 0 and 1 are used by an antenna port 15 to transmit a CSI-RS, and an antenna port 16 transmits a CSI-RS by performing an orthogonal code cover (OCC) operation on the same resource elements. That it, if two antenna ports are used in Table 1 and Table 2, all resource elements that can be mapped to the CSI-RS can be expressed as shown in FIG. 13 (in case of the normal CP) and in FIG. 14 (in case of the extended CP). Then, 20 CSI-RS configurations are present in total in case of the normal CP, and 16 CSI-RS configurations are present in total in case of the extended CP.

If the CSI-RS is transmitted by using four antenna ports, the antenna ports are mapped to the same resource element in a unit of two and are identified by using the OCC. For example, antenna ports 15 and 16 are mapped to the same resource elements (indicated by 0 and 1) and are identified by the OCC, and antenna ports 17 and 18 are mapped to the same resource elements (indicated by 2 and 3) and are identified by the OCC. Referring to FIG. 13 (b) and FIG. 14 (b), CSI-RSs of the antenna ports 15 and 16 are mapped to resource elements indicated by 0 and 1, and CSI-RSs of the antenna ports 17 and 18 are mapped to resource elements indicated by 2 and 3. Then, 10 CSI-RS configurations are present in the normal CP, and 8 CSI-RS configurations are present in the extended CP.

Referring to FIG. 13 (c) and FIG. 14 (c), the antenna ports 15 and 16 transmit CSI-RSs by using the same resource elements (indicated by 0 and 1) and are identified by the OCC, and the antenna ports 17 and 18 transmit CSI-RSs by using the same resource elements (indicated by 2 and 3) and are identified by the OCC. CSI-RSs for the antenna ports 19 and 20 are mapped to resource elements indicated by 4 and 5, and CSI-RSs for the antenna ports 21 and 22 are mapped to resource elements indicated by 6 and 7. Then, 5 CSI-RS configurations are present in total in case of the normal CP, and 4 CSI-RS configurations are present in total in case of the extended CP. As described above, according to the CSI-RS configuration number, a resource element for transmitting a CSI-RS depending on the number of antenna ports can be determined.

In addition, as described with reference to Table 3 above in association with a subframe in which a CSI-RS is transmitted, the CSI-RS can be transmitted with a period at least 5 subframes up to 80 subframes. That is, if a virtual cell specific signal is a CSI-RS, a transmission time of the CSI-RS used by a virtual cell is determined according to a CSI-RS subframe configuration number.

In order to support an advanced UE, a virtual cell system can transmit a mother cell specific CSI-RS and a virtual cell specific CSI-RS.

The mother cell specific CSI-RS can be transmitted by using a reference signal sequence generated based on a cell ID of a mother cell. The advanced UE can receive the CSI-RS of the mother cell by using the mother cell's cell ID obtained from a synchronization signal, a mother cell's CSI-RS configuration number received from a mother cell-based higher layer message, and a mother cell's CSI-RS subframe configuration number.

The UE can detect a virtual cell's CSI-RS configuration and a virtual cell's CSI-RS subframe configuration by using the mother cell's CSI-RS configuration number and the mother cell's CSI-RS subframe configuration number. This is because, according to the present invention, the virtual cell's CSI-RS configuration and the CSI-RS subframe configuration are dependent on the mother cell's CSI-RS configuration and CSI-RS subframe configuration.

A relation between the virtual cell's CSI-RS configuration and CSI-RS subframe configuration and the mother cell's CSI-RS configuration and CSI-RS subframe configuration may be any one of various methods described below.

Several terms will be first defined for convenience of explanation.

$C_{MCELL}$ denotes a CSI-RS configuration number of a mother cell. $I_{MCELL}$ denotes a CSI-RS subframe configuration number of the mother cell. $C_{VCELL}$ denotes a CSI-RS configuration number of a virtual cell. $I_{VCELL}$ denotes a CSI-RS subframe configuration number of the virtual cell.

In addition, the maximum number of available CSI-RS configurations in the virtual cell is defined by $N_{CC}$. That is, $N_{CC}$ denotes the total number of CSI-RS configuration defined based on a given situation (e.g., the number of given CSI-RS ports, a CP type (i.e., normal CP or extended CP), a frame structure type, etc.) or denotes a maximum number of CSI-RS configuration by using a total resource element area (i.e., nulled REs) defined by configuration of zero-power CSI-RS within a subframe.

Q(a, n) denotes an operator for returning a quotient of 'a' divided by 'n', and R(a,n) denotes an operator for returning a reminder of 'a' divided by 'n'.

In addition, it is assumed that the number of antenna ports for transmitting a CSI-RS is identical in the mother cell and the virtual cell or is equal to or less than 2 in the method described below.

Methods of determining a relation between a virtual cell's CSI-RS configuration and CSI-RS subframe configuration and a mother cell's CSI-RS configuration and CSI-RS subframe configuration will be described hereinafter by using the aforementioned definition.

Among $v_{max}$ virtual cells, a $v_{ID}^{th}$ virtual cell can have a CSI-RS configuration number and a CSI-RS subframe configuration number as follows. Herein, $v_{ID}$ is any one of $\{1, 2, \ldots, v_{max}\}$.

Method 1: A method of shifting a CSI-RS configuration number continuously while virtual cells have a fixed CSI-RS subframe configuration number.

$v_{ID}^{th}$ virtual cell's CSI-RS configuration number $C_{VCELL}$ and CSI-RS subframe configuration number $I_{VCELL}$ can be determined by Equation 8 below.

$$C_{VCELL}(v_{ID}) = R(C_{MCELL} + \Delta_c \cdot v_{ID}, N_{CC})$$

$$I_{VCELL}(v_{ID}) = I_{MCELL} + I_{offset} \quad \text{[Equation 8]}$$

In Equation 8 above, A, is any integer indicating a step size of a CSI-RS configuration number. The step size may be a value used as a unit of variation of the CSI-RS configuration number. For example, $\Delta_c$ may be 1. $I_{offset}$ denotes a CSI-RS subframe configuration number offset, and may be signaled by using a higher layer signal or may be a predetermined value. For example, $I_{offset}$ may be 0.

That is, when using Method 1, a fixed value which is different by a specific offset from the mother cell is used as a CSI-RS subframe configuration number in all virtual cells, and a CSI-RS configuration number sequentially uses a configuration which is different by a $\Delta_c \times v_{ID}$ from the mother cell. That is, the virtual cell's CSI-RS configuration number may be a value obtained by increasing a CSI-RS configuration number of the mother cell (e.g., BS) on the basis of an index of the virtual cell (e.g., a node in a virtual cell system).

If $\Delta_c$ and $N_{cc}$ are relatively primes to each other and $I_{offset}$ is 0, then the mother cell and the virtual cell use the same CSI-RS subframe configuration. Therefore, the maximum number $v_{max}$ of available virtual cells that can be supported by this method is limited to $N_{cc}-1$. If $I_{offset}$ is not 0, the maximum number $v_{max}$ of available virtual cells that can be supported by this method is limited to $N_{cc}$.

In Method 1, if the mother cell and the virtual cell have different CSI-RS periodicities, $I_{offset}$ can be determined according to a difference of the CSI-RS periodicities. For example, if the CSI-RS periodicity of the virtual cell is fixed to 10, $I_{offset}$ can be defined by Equation 9 below according to a range of the CSI-RS configuration number of the mother cell.

$$I_{offset} = \begin{cases} I_{offset2} + 5, & \text{if } I_{MCELL} < 5 \\ I_{offset2} - 10Q(I_{MCELL} - 5, 10), & \text{if } I_{MCELL} \geq 5 \end{cases} \quad \text{[Equation 9]}$$

In Equation 9 above, $I_{offset2}$ is an integer that exists in the range of $-10 < I_{offset2} < 10$. According to Equation 9 above, the CSI-RS configuration number of the virtual cell is limited to the range between $(5+I_{offset2})$ and $(15+I_{offset2})$.

Alternatively, allocation can be performed compulsively within a range predetermined according to a CSI-RS periodicity $T_{VCELL}$ of the virtual cell.

$$I_{VCELL}(v_{ID}) = T_{VCELL} - 5 + R(S_{MCELL} + I_{offset}, T_{VCELL}) \quad \text{[Equation 10]}$$

In Equation 10 above, $S_{MCELL}$ denotes a CSI-RS subframe offset $\Delta_{CSI-RS}$ of the mother cell. Herein, a difference of CSI-RS subframe offsets of the mother cell and the virtual cell can be allocated fixedly by $I_{offset}$.

Figure 15:
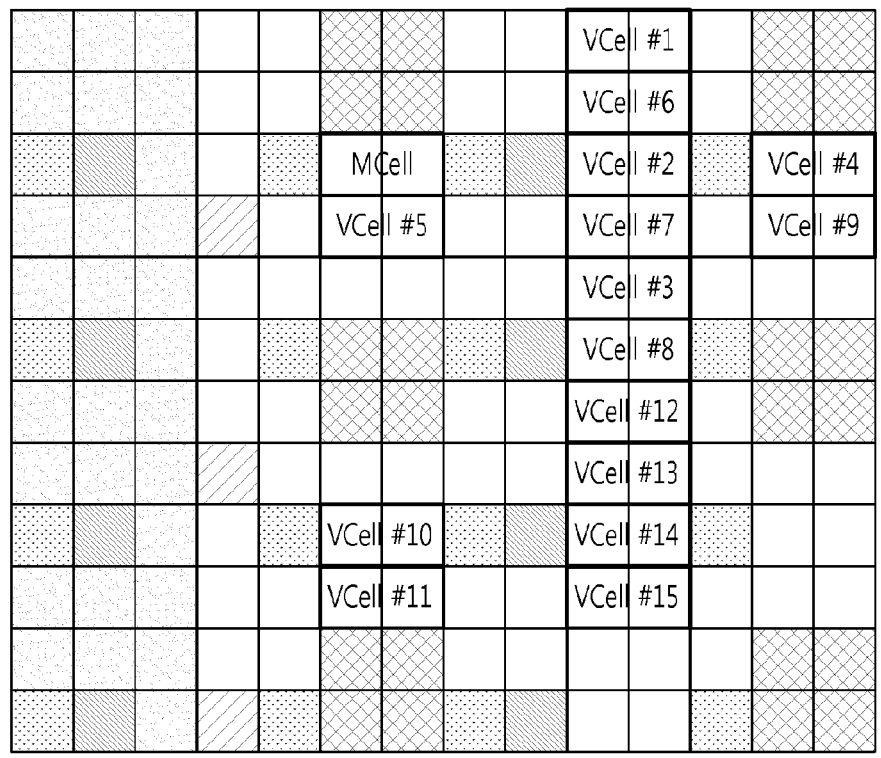
FIG. 15 shows an example of Method 1.

FIG. 15 shows an example of Method 1.

It is assumed hereinafter that all mother cells have a CSI-RS configuration number of 0 and a CSI-RS subframe configuration number of 0 (i.e., a CSI-RS periodicity of 5 subframe) in the drawings for explaining Method 1 to Method 5. It is also assumed that the number of antenna ports for transmitting CSI-RSs of a mother cell and a virtual cell is less than or equal to 2, and a normal CP is used. It is also assumed that a step size is 1, i.e., $\Delta_C = \Delta_S = 1$, in all examples. It is also assumed that configuration offset values (i.e., $C_{offset} = I_{offset} = 0$) are 0. However, this is for exemplary purposes only, and thus the present invention is not limited thereto.

Referring to FIG. 15, the total number of virtual cells is 15. The 15 virtual cells transmit a CSI-RS by using different resource elements in the same subframe as shown in FIG. 15. This is because CSI-RS configuration numbers of the virtual cells are used by being shifted in sequence.

Method 2: A method of shifting CSI-RS configuration numbers of virtual cells continuously while shifting CSI-RS subframe offsets of the virtual cells.

$v_{ID}{}^{th}$ virtual cell's CSI-RS configuration number $C_{VCELL}$ and CSI-RS subframe configuration number $I_{VCELL}$ can be determined by Equation 11 below.

$$C_{VCELL}(v_{ID})=R(C_{MCELL}+\Delta_c \cdot v_{ID}, N_{CC}),$$

$$I_{VCELL}(v_{ID})=T_{VCELL}-5+R(S_{MCELL}+I_{offset}+\Delta_s \cdot Q(\Delta_c \cdot v_{ID}, N_{CC})T_{VCELL}).$$ [Equation 11]

In Equation 11 above, $\Delta_c$ is any integer indicating a step size of a CSI-RS configuration number. $\Delta_s$ is an integer indicating a step size of the CSI-RS subframe configuration number. $T_{VCELL}$ denotes a CSI-RS periodicity $T_{CSI-RS}$ of the virtual cell. $S_{MCELL}$ denotes a CSI-RS subframe offset $\Delta_{CSI-RS}$ of the mother cell (i.e., $S_{MCELL}=I_{MCELL}-T_{MCELL}+5$).

That is, Method 2 is a method of changing a CSI-RS subframe configuration number when $\Delta_c \times v_{ID}$ exceeds $N_{cc}$, after a CSI-RS configuration number is allocated to the virtual cell by sequentially shifting it as described in Method 1 in order to overcome a disadvantage in that the number of virtual cells that can be supported in Method 1 is limited. Therefore, when using Method 2, up to $(T_{MCELL} \times N_{cc}-1)$ virtual cell specific CSI-RSs can be transmitted. That is, the CSI-RS can be transmitted in up to $(T_{MCELL} \times N_{cc}-1)$ virtual cells.

Figure 16:
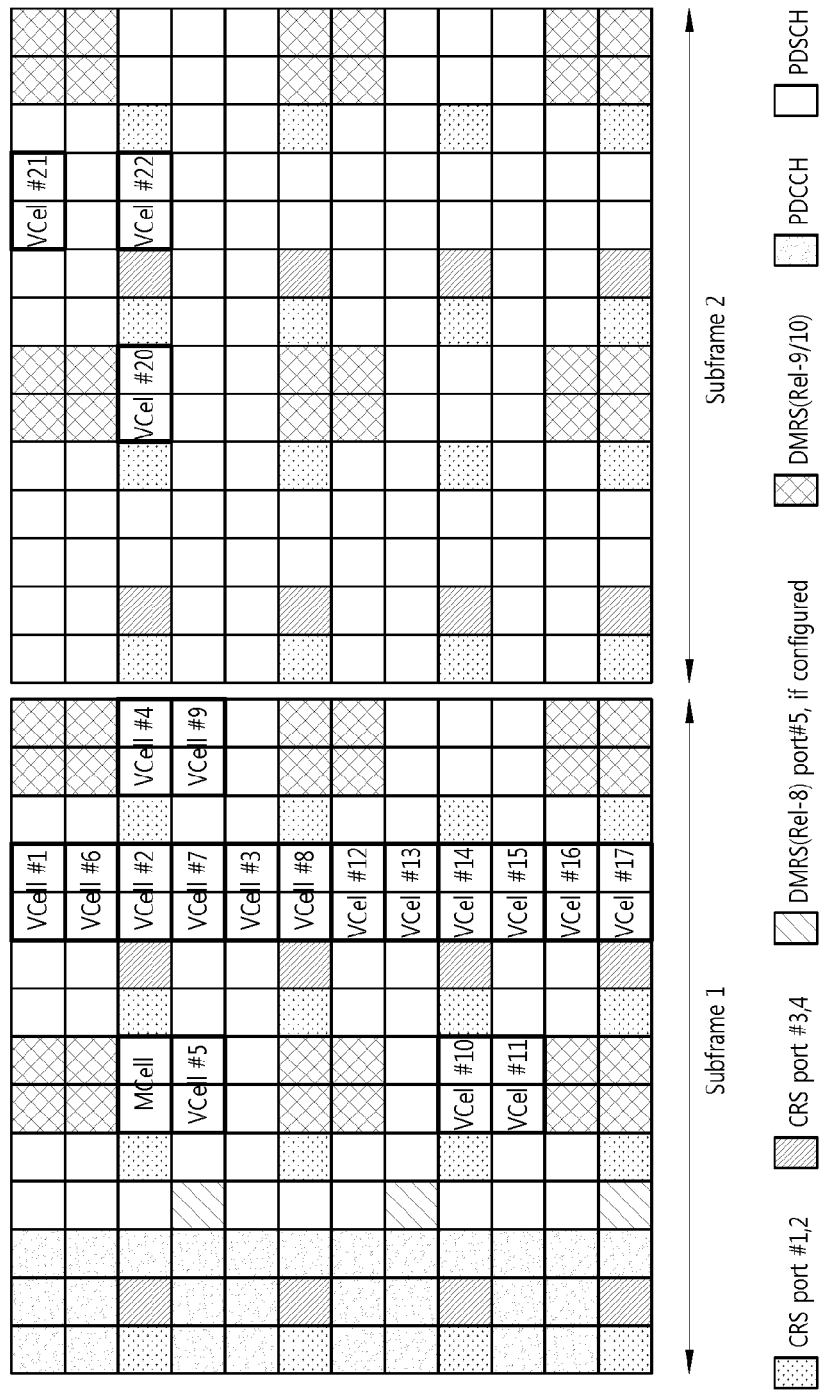
FIG. 16 shows an example of Method 2.

FIG. 16 shows an example of Method 2.

Referring to FIG. 16, the total number of virtual cells is 22. When applying Method 2 to the 22 virtual cells, a CSI-RS for 19 virtual cells is transmitted in a subframe 1, and a CSI-RS for 3 virtual cells is transmitted in a subframe 2 subsequent to the subframe 1. That is, if the number of virtual cells that are present in one subframe is greater than the number $N_{cc}$ of CSI-RSs that can be transmitted without overlapping resource elements, then a CSI-RS of some virtual cells is transmitted in that subframe, and a CSI-RS of the remaining virtual cells is transmitted in a subsequent upcoming subframe.

Method 3: A method of shifting a CSI-RS subframe offset continuously while virtual cells have a fixed CSI-RS configuration number.

$v_{ID}{}^{th}$ virtual cell's CSI-RS configuration number $C_{VCELL}$ and CSI-RS subframe configuration number $I_{VCELL}$ can be determined by Equation 12 below.

$$C_{VCELL}(v_{ID})=C_{MCELL}+C_{offset},$$

$$I_{VCELL}(v_{ID})=T_{MCELL}-5+R(S_{MCELL}+I_{offset}+\Delta_s \cdot v_{ID}, T_{MCELL})$$ [Equation 12]

In Equation 12 above, $C_{offset}$ denotes a CSI-RS configuration number offset, and may be signaled by using a higher layer signal or may be a predetermined value, e.g., 0. $\Delta_s$ is any integer indicating a step size of the CSI-RS subframe configuration number. T MCELL denotes a CSI-RS periodicity $T_{CSI-RS}$ of the mother cell.

That is, Method 3 is a method of sequentially using a value which is different by $\Delta_s \times v_{ID}$ from the mother cell as a CSI-RS subframe configuration number while all virtual cell equally use a CSI-RS configuration number which is different by a specific offset from the mother cell (or uses the same CSI-RS configuration number as that of the mother cell). In other words, a CSI-RS configuration number of a node that constitutes the virtual cell has the same value (or fixed value) as a CSI-RS configuration number of a BS that constitutes the mother cell, and a CSI-RS subframe configuration number of the node may be a value obtained by increasing the CSI-RS subframe configuration number of the BS on the basis of an index of the node.

In this case, a CSI-RS periodicity of the virtual cell may be the same as that of the mother cell. Therefore, if $C_{offset}=0$, the maximum number of virtual cells capable of transmitting the CSI-RS in this method is limited to (mother cell's CSI-RS periodicity $T_{MCELL}-1$), and if $C_{offset}$ is not 0, it is limited to a mother cell's CSI-RS periodicity $T_{MCELL}$.

Figure 17:
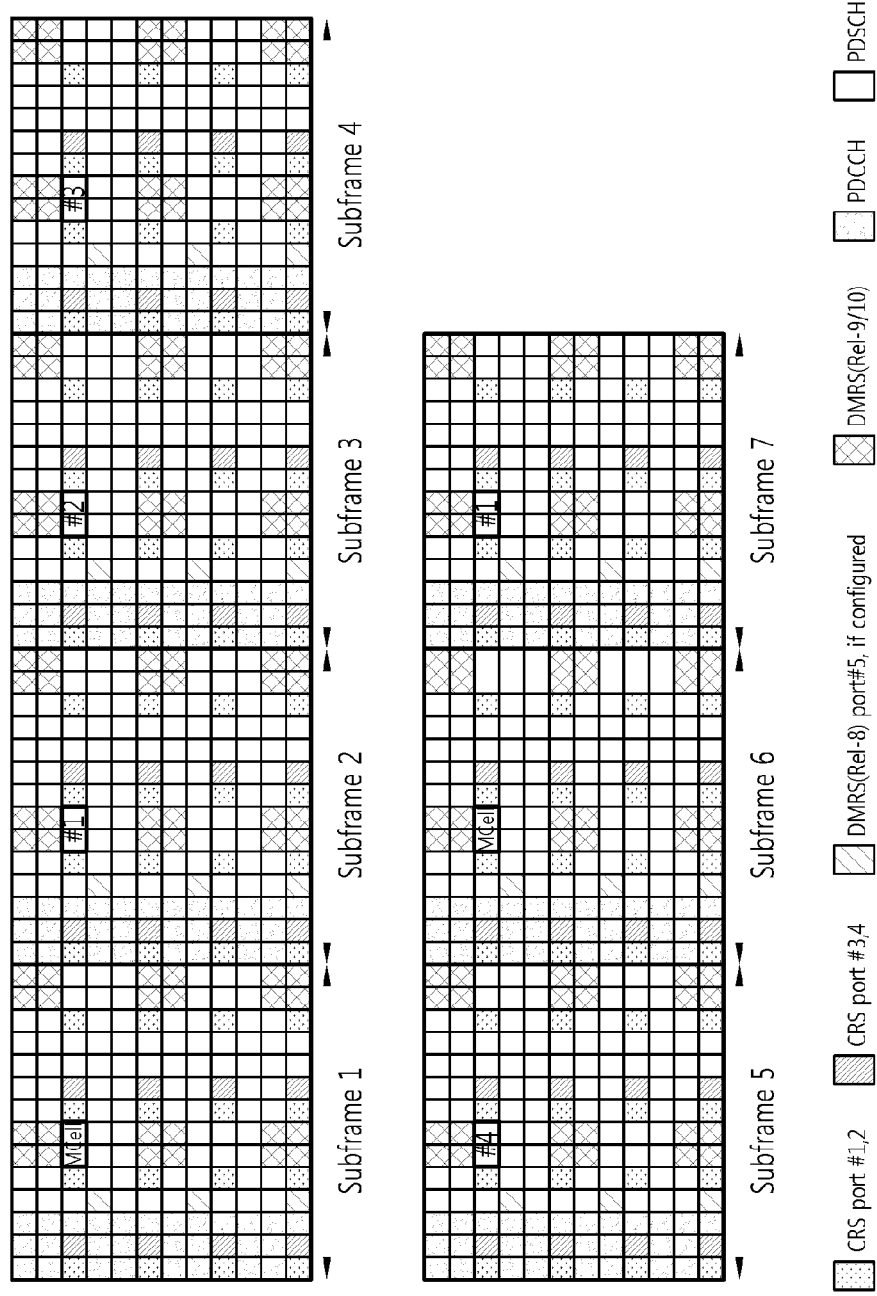
FIG. 17 shows an example of Method 3.

FIG. 17 shows an example of Method 3.

Referring to FIG. 17, an example of applying Method 3 is described when the total number of virtual cells is 4. A CSI-RS periodicity of each virtual cell is 5 subframes equally to the case of a mother cell, but a CSI-RS is transmitted on the same resource element of a different subframe by allowing a CSI-RS subframe offset to have a different value. That is, the mother cell transmit the CSI-RS in subframes 1 and 6, and a virtual cell #1 transmits the CSI-RS in subframes 2 and 7. A virtual cell #2 transmits the CSI-RS in subframes 3 and 8. A virtual cell #3 transmits the CSI-RS in subframes 4 and 9. A virtual cell #4 transmits the CSI-RS in subframes 5 and 10.

Method 4. A generalized method of shifting a CSI-RS subframe offset of a virtual cell while virtual cells have a fixed CSI-RS configuration number.

$v_{ID}{}^{th}$ virtual cell's CSI-RS configuration number $C_{VCELL}$ and CSI-RS subframe configuration number $I_{VCELL}$ can be determined by Equation 13 below.

$$C_{VCELL}(v_{ID})=C_{MCELL}+C_{offset},$$

$$I_{VCELL}(v_{ID})=T_{VCELL}-5+R(\text{Offset}(v_{ID},I_{MCELL}), T_{VCELL}),$$ [Equation 13]

In Equation 13 above, $T_{VCELL}$ denotes a CSI-RS periodicity of the virtual cell, and may be signaled by using a higher layer signal or may be a predetermined value. For example, $T_{VCELL}$ can be determined to $N \times T_{MCELL}$, $T_{VCELL}=5M$. Herein, N and M are positive integers. Offset($v_{ID}$, $I_{MCELL}$) returns a CSI-RS subframe offset of a $v_{ID}{}^{th}$ virtual cell with respect to a given value $I_{MCELL}$. In this case, a different $v_{ID}$ has a different ent output value. For example, it can be determined such as Offset($v_{ID}$, $I_{MCELL}$)=$\Delta s \times v_{ID}+S_{MCELL}$ or Offset($v_{ID}$, $I_{MCELL}$)=$\Delta s \times v_{ID}$.

Method 4 can be seen as a further generalized method of Method 3. That is, all virtual cells have the same CSI-RS configuration number and CSI-RS periodicity. In this case, similarly to Method 3, a CSI-RS periodicity of the virtual cell may be dependent on a periodicity of the mother cell (e.g., $T_{VCELL}=2 \times T_{MCELL}$), or may be independent (e.g., $T_{VCELL}$ can be signaled by using a higher layer signal). Different CSI-RS subframe configuration numbers can be sequentially given to respective virtual cells. Giving the different CSI-RS subframe configuration numbers to the virtual cells implies that the respective virtual cells have the same CSI-RS transmission period but have different CSI-RS subframe offsets.

In this case, in order to avoid interference to the mother cell, the virtual cells may not be allowed to transmit a CSI-RS in a subframe in which the mother cell transmits the CSI-RS. Such a method is referred to as muting of a virtual cell subframe. In equation 13 described above, for muting of the virtual cell subframe can be defined as follows.

$$\text{Offset}(v_{ID},I_{MCELL})=v_{ID}+S_{MCELL}+Q(v_{ID},T_{MCELL}) \qquad 1.$$

$$\text{Offset}(v_{ID},I_{MCELL})=v_{ID}-1+Q(v_{ID}-1+T_{MCELL}-S_{MCELL}, T_{MCELL}) \qquad 2.$$

The first equation relates to a method of transmitting a CSI-RS in each virtual cell while increasing a CSI-RS subframe offset one by one with respect to a CSI-RS subframe offset of the mother cell. The second equation relates to a method of transmitting a CSI-RS while increasing a CSI-RS subframe offset value one by one starting from a CSI-RS subframe offset=0 by each virtual cell. In both of the two methods, the virtual cell does not transmit a CSI-RS in a subframe in which the mother cell transmits the CSI-RS.

As such, when using the virtual cell subframe muting scheme, the number of virtual cells capable of transmitting a virtual cell specific CSI-RS is limited to a value obtained by subtracting max(1, $T_{VCELL}/T_{MCELL}$) from the CSI-RS periodicity of the virtual cell. That is, $v_{max}=T_{VCELL}-\max(1, T_{VCELL}/T_{MCELL})$ In case of not using the virtual cell subframe muting scheme, the number of virtual cells capable of transmitting the virtual cell specific CSI-RS is limited to the CSI-RS periodicity of the virtual cell. That is, $v_{max}=T_{VCELL}$.

Figure 18:
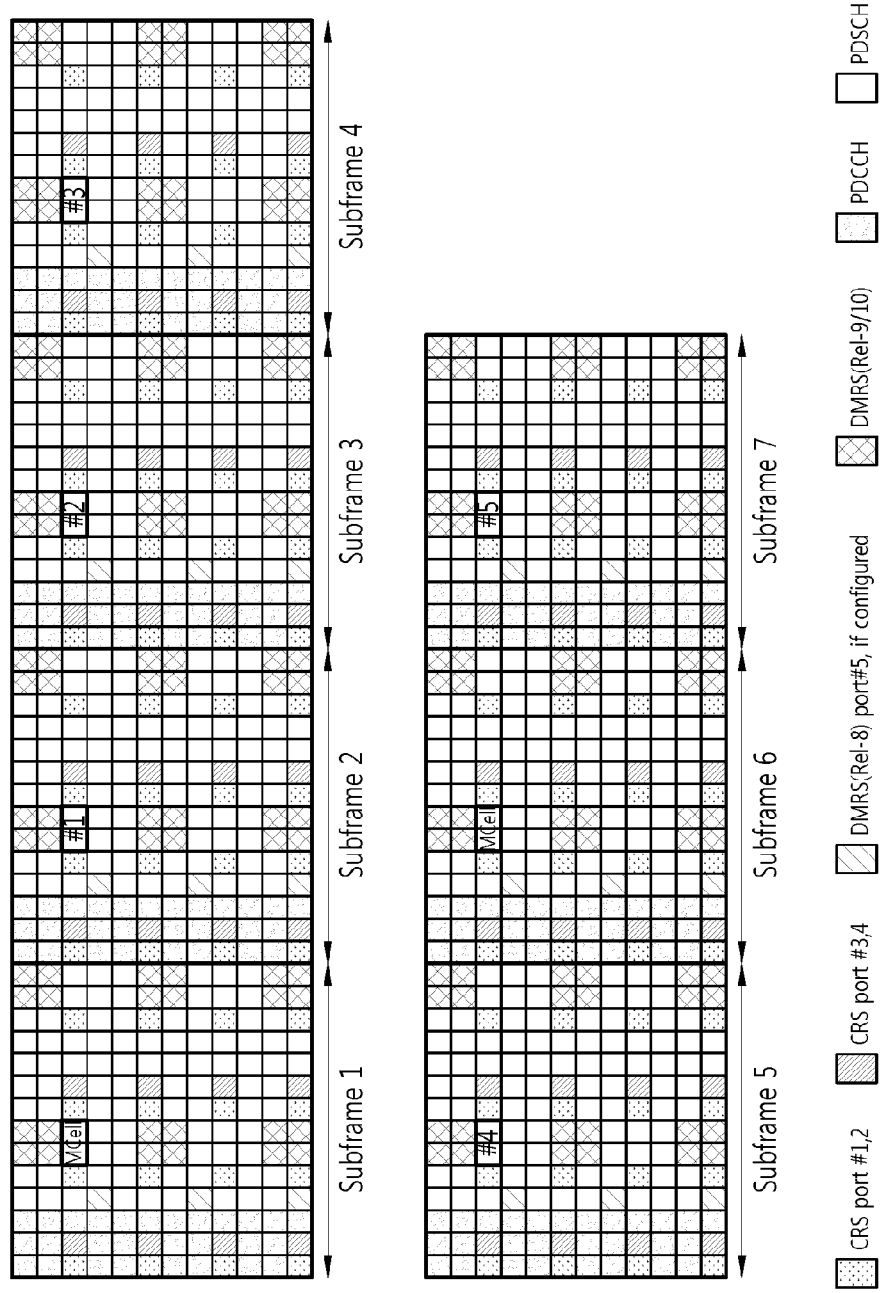
FIG. 18 shows an example of Method 4.

FIG. 18 shows an example of Method 4.

Referring to FIG. 18, an example of using Method 4 is described when the total number of virtual cells is 5. The virtual cells have a CSI-RS periodicity (i.e., $T_{VCELL}=10$) corresponding to 10 subframes which is twice as high as that of a mother cell. This shows a case where a transmission period is set to a multiple of a CSI-RS periodicity of the mother cell since the number of virtual cells is 5. A CSI-RS of the mother cell is transmitted in a subframe 1, and a CSI-RS of a virtual cell #1 is transmitted on the same resource element of a subframe 2. In addition, a CSI-RS of a virtual cell #2 is transmitted in a subframe 3, a CSI-RS of a virtual cell #3 is transmitted in a subframe 4, and a CSI-RS of a virtual cell #4 is transmitted in a subframe 5. A CSI-RS of a mother cell of which a CSI-RS periodicity corresponds to 5 subframes is transmitted in a subframe 6. A CSI-RS of a virtual cell #5 is transmitted in a subframe 7. That is, muting of a virtual cell subframe is applied to the example of FIG. 18.

Method 5: A method of changing a CSI-RS configuration number when a subframe that can be used by virtual cells are used completely while the virtual cells shift a CSI-RS subframe configuration number and use a CSI-RS configuration number equally to that of a mother cell.

$v_{ID}^{th}$ virtual cell's CSI-RS configuration number $C_{VCELL}$ and CSI-RS subframe configuration number $I_{VCELL}$ can be determined by Equation 14 below.

$$C_{VCELL}(v_{ID})=R(C_{MCELL}+C_{offset}+\Delta_c \cdot Q(v_{ID}-1, T_{VCELL}-\max(1,T_{VCELL}/T_{MCELL})),N_{CC}),$$

$$I_{VCELL}(v_{ID})=T_{VCELL}-5+R(\text{Offset}(v_{ID},I_{MCELL}),T_{VCELL}) \quad \text{[Equation 14]}$$

In order to overcome a disadvantage in that the number of virtual cells capable of transmitting a CSI-RS is limited in Method 3 and Method 4 above, Method 5 is used such that respective virtual cells use the same CSI-RS configuration number as that of the mother cell and when a subframe that can be used by the virtual cells is completely used while changing and using a CSI-RS subframe configuration number, the virtual cells change the CSI-RS configuration number and thereafter sequentially allocate the CSI-RS subframe configuration number again starting from an upcoming virtual cell. Therefore, the maximum number of virtual cell CSI-RSs that can be transmitted is increased by up to $(T_{VCELL}-\max(1, T_{VCELL}/T_{MCELL}))\times N_{CC}$. That is, the number of virtual cells capable of transmitting a virtual cell specific CSI-RS is up to $(T_{VCELL}-\max(1, T_{VCELL}/T_{MCELL}))\times N_{CC}$.

$T_{VCELL}-\max(1, T_{VCELL}/T_{MCELL})$ is used in Equation 14 above because it is assumed that muting of the virtual cell subframe is used. If muting of the virtual cell subframe is applied only when the CSI-RS configuration number of the virtual cell is equal to that of the mother cell, then the $v_{ID}^{th}$ virtual cell's CSI-RS configuration number $C_{VCELL}$ and the CSI-RS subframe configuration number $I_{VCELL}$ can be determined by Equation 15 below.

$$C_{VCELL}(v_{ID})=R(C_{MCELL}+C_{offset}+\Delta_c \cdot Q(v_{ID}-1+Y,T_{VCELL}-X),N_{CC}), \quad \text{[Equation 15]}$$

where $X=\max(1,T_{VCELL}/T_{MCELL})$ & $Y=0$, if $v_{ID}\leq T_{VCELL}$, $X=0$ & $Y=1$, otherwise.

According to Equation 15 above, the number of virtual cell CSI-RSs is increased in comparison with Equation 14.

Figure 19:
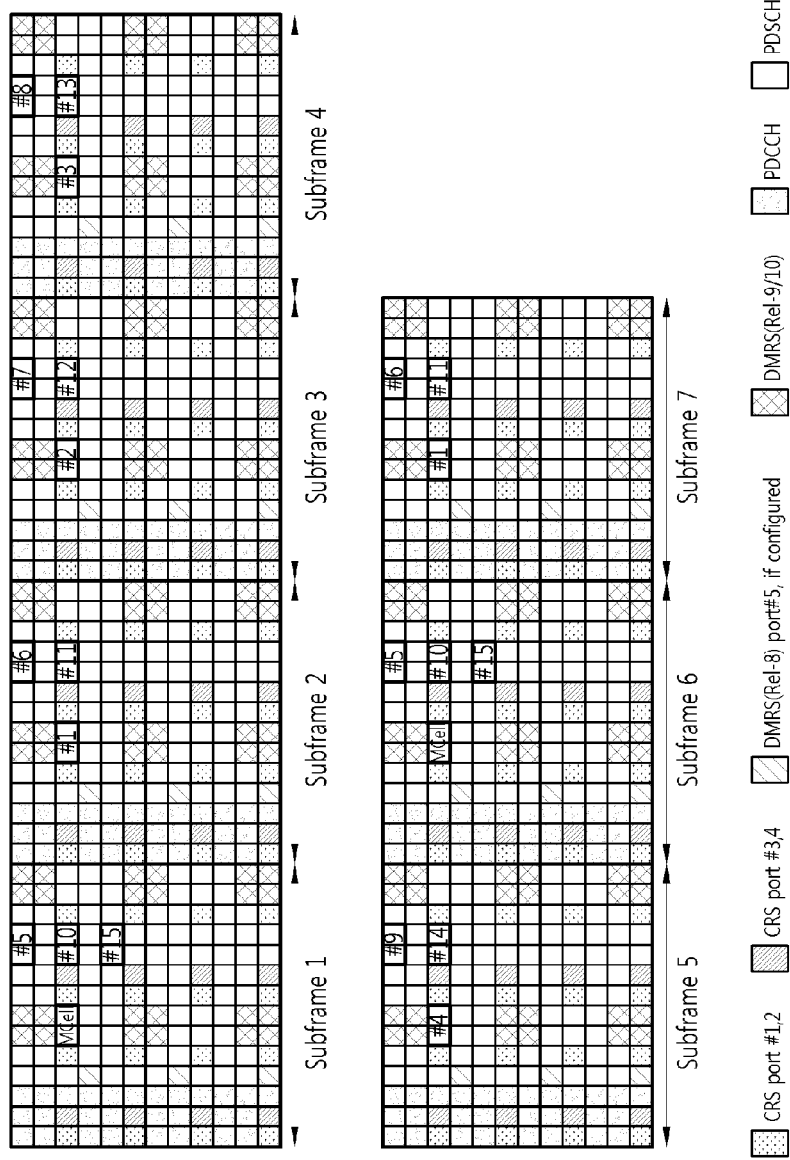
FIG. 19 shows an example of Method 5.

FIG. 19 shows an example of Method 5.

Referring to FIG. 19, the total number of virtual cells is 15, and a CSI-RS periodicity $T_{VCELL}$ of the virtual cells corresponds to 5 subframes. In this case, when using Method 5, a mother cell and virtual cells #5, #10, and #15 transmit a CSI-RS by using different resource elements in a subframe 1. Virtual cells #1, #6, and #11 transmit a CSI-RS in a subframe 2. Virtual cells #2, #7, and #12 transmit a CSI-RS in a subframe 3. Virtual cells #3, #8, and #13 transmit a CSI-RS in a subframe 4. Virtual cells #4, #9, and #14 transmit a CSI-RS in a subframe 5. With this time pattern, the mother cell and the virtual cells #5, #10, and #15 transmit a CSI-RS again in a subframe 6, and likewise, the virtual cells #1, #6, and #11 transmit a CSI-RS in a subframe 7. That is, the virtual cells and the mother cell use the same CSI-RS configuration number, and transmit the CSI-RS while changing a CSI-RS subframe configuration number. That is, with the same CSI-RS configuration number, the virtual cells #1 to #4 transmit a CSI-RS while changing a CSI-RS subframe configuration number. The virtual cell #5 has no subframe that can be further transmitted by using the same CSI-RS configuration number, and thus transmits a CSI-RS in the subframes 1 to 5 by changing the CSI-RS configuration number. The same is also true in the virtual cells #6 to #9. The virtual cell #10 transmits a CSI-RS in the subframe 1 after changing the CSI-RS configuration number.

The number of CSI-RS ports used in the mother cell and the virtual cells may be different. In this case, the aforementioned equations may need to be modified. This is because the virtual cells must not use a resource element used by a CSI-RS of the mother cell with respect to CSI-RS antenna parts which are used by the mother cell and not used by the virtual cells.

In this case, although a basic resource allocation method remains without alternation, a CSI-RS configuration number that must not be used by the virtual cells is additionally generated, and thus there is a need to modify the equations. For example, in case of using a normal CP, when the mother cell and the virtual cells transmit a CSI-RS in the same subframe, if the mother cell uses 8 CSI-RS antenna ports and a CSI-RS configuration number=0, then there is no overlapping resource elements used for CSI-RS transmission in the mother cell only when virtual cells that use one or two CSI-RS antenna ports do not use not only the CSI-RS configuration number=0 but also CSI-RS configuration numbers 5, 10, and 11. Therefore, in this case, the equations can be modified to avoid a plurality of CSI-RS configuration numbers.

By using any one of the aforementioned five methods, the BS can report the total number of virtual cells to the UE, and then the UE can detect a virtual cell specific CSI-RS from a resource element that can be known by using a parameter (or a reference parameter) of a mother cell, measure a measurement value (e.g., RSRP, RSRQ, path loss, etc.) for each virtual cell specific CSI-RS, and feed back the measurement value to the BS. In this case, the UE can feed back an index $v_{ID}$ for a preferred virtual cell to the BS.

Embodiment 3

Antenna Port Number of Virtual Cell

Hereinafter, a method of obtaining a virtual cell parameter by using a reference parameter will be described in a case where the virtual cell parameter is a CSI-RS antenna port number of a virtual cell.

With respect to a specific reference value i{1, 2, ..., N}, a reference parameter that can be given by a BS is as follows: 1) CSI-RS configuration number #$x_i$; 2) CSI-RS subframe configuration number #$y_i$, and 3) Number of CSI-RS antenna ports $N_i$.

In this case, if a virtual cell index $v_{i,}$ (which is an integer satisfying ≥1) is in the range between $$1 + \sum_{j=0}^{i-1} N_j$$

and $$\sum_{j=0}^{i} N_j$$

(where $N_0=0$), then a virtual cell having an index $v_{ID}$ can use a CSI-RS antenna port number expressed by Equation 16 below, while using the CSI-RS configuration number #$x_i$ and the CSI-RS subframe configuration number #$y_i$.

$$14 + v_{ID} - \sum_{j=0}^{i-1} N_j \quad \text{[Equation 16]}$$

In this method, a CSI-RS antenna port number used by the virtual cell is given by sequentially increasing it one by one according to a specific reference parameter. In this case, the UE can provide the BS with a feedback for each CSI-RS antenna port (or for some CSI-RS antenna ports). Since the maximum number of CSI-RS antenna ports is 8 under one CSI-RS configuration number, this method assumes multiple CSI-RS configuration numbers in order to support 8 or more virtual cells.

The reference parameter can be defined equally to a parameter of the mother cell or can be defined to be dependent on the mother cell. For example, some parameters of the reference parameters can be defined equally to those of the mother cell, and the remaining reference parameters can be determined to be different by a specific value in sequence from a CSI-RS configuration number and/or CSI-RS subframe configuration number of the mother cell.

Then, the UE can obtain all reference parameters while obtaining the parameters of the mother cell, and thus the BS do not have to report the reference parameters to the UE by using explicit signaling. Therefore, there is an advantage in that signaling overhead is reduced.

When the reference parameter conforms to the parameter of the mother cell, Equation 16 above can be modified so that the virtual cell does not use a transmission resource element of a CSI-RS used by the mother cell. For example, if the mother cell uses an antenna port #15, then a virtual cell #$v_{ID}${1, 2, ..., $N_t$-1} uses the same CSI-RS configuration number and CSI-RS subframe configuration number as those of the mother cell, and can be modified to use an antenna port #(15+$v_{ID}$) other than the antenna port #15.

Hereinafter, a method of allocating a cell ID deviated from a range of the conventional cell ID in a virtual cell will be described.

In a system including the virtual cell, legacy UEs cannot implement a technique of using the virtual cell. Therefore, there is no need to recognize the virtual cells. For example, in case of an LTE system, all nodes transmit the same CRS corresponding to a mother cell ID, and the legacy UEs measure a channel by using the CRS, and thus cannot recognize the virtual cell.

For an advanced UE, a BS can transmit a CSI-RS generated by using the mother cell ID concurrently to all virtual cells to disable recognition of the virtual cell. Alternatively, for the advanced UEs, an RS (e.g., CSI-RS) generated by using its virtual cell ID can be transmitted in each virtual cell so as to allow the advanced UEs to perform channel estimation for each virtual cell. Due to such a characteristic, the virtual cell ID can use a cell ID which is not used for the legacy UE.

<Method of Allocating Cell ID of Virtual Cell>

In case of LTE, a cell ID is in an integer range of 0 to 503. In case of IEEE 802.16, the cell ID is in an integer range of 0 to 767. A BS can transmit a synchronization signal dedicated for a virtual cell by using a cell ID deviated from a cell ID usage range of the legacy system.

That is, the BS can transmit the synchronization signal for each virtual cell in order to deliver a virtual cell ID to a virtual cell UE or to receive a feedback of a measurement value (e.g., CQI, path loss, etc.) for the virtual cell. In this case, the BS can transmit a synchronization signal by using a cell ID deviated from the cell ID usage range of the legacy system.

1. In Case of LTE

In LTE, a UE obtains a cell ID by using a synchronization signal. For example, $N_{ID}^{(2)}$ is obtained by using a primary synchronization signal (PSS), and $N_{ID}^{(1)}$ is obtained by using a secondary synchronization signal (SSS). That is, the UE obtains $N_{ID}^{(2)}$ by using the PSS, and thereafter obtains $N_{ID}^{(1)}$ by using the SSS. Then UE obtains a final cell ID.

In this case, the virtual cell ID can determine any integer values N and L equal to or greater than 0 to have a range of $N+168 \leq N_{ID}^{(1)} \leq N+L+169$. Then, a range of the virtual cell ID is determined by L, and thus signaling overhead and cell search overhead can be regulated.

In addition, the virtual cell ID can be defined such that $N_{ID}^{(2)}$ has only a specific value. The specific value may be a predetermined fixed value, e.g., $N_{ID}^{(2)}=0$, or may be a value dependent on a mother cell ID. Then, there is an advantage in that PSS detection can be skipped when the UE searches for a virtual cell. On the contrary, the BS can transmit only the SSS for each virtual cell when transmitting the synchronization signal for the virtual cell. The UE can know the value $N_{ID}^{(2)}$ of the virtual cell from the mother cell ID or is aware of this value as a predetermined value, and thus the BS does not have to perform additional signaling to the UE. Therefore, there is no need to transmit the PSS for each virtual cell.

2. In Case of LTE & IEEE 802.16

$N_{ID}^{(2)}$ delivered by a PSS of LTE has 2 bits in terms of an information amount, and at present, only values 0, 1, and 2 are used and a value 3 is not used. That is, only any one of the values 0, 1, and 2 is delivered. Therefore, a virtual cell ID can be defined to have $N_{ID}^{(2)}=3$. In case of IEEE 802.16, the cell ID can be obtained by 256n+Idx. In this case, a virtual cell can be defined to use n=3.

Then, a UE can obtain low signaling overhead and cell search overhead since a range of the virtual cell ID is decreased. In addition, interference between PSSs transmitted by the virtual cell and a mother cell can be controlled by using an orthogonal sequence, and thus a virtual cell specific PSS can be transmitted. The virtual cell specific PSS can be provided to increase accuracy of synchronization of the UE when a distance of the virtual cells is far.

In addition, there is an advantage in that the UE can identify the virtual cell and a non-virtual cell (called a normal cell) by using only the PSS. That is, when the virtual cell transmits a synchronization signal identified from the normal cell, the UE can easily identify, for example, whether a corresponding cell is the virtual cell or the normal cell after obtaining the PSS. Even if the synchronization signal is not transmitted in every virtual cell, when a reference signal that can be identified for each virtual cell is present, the UE can use the reference signal to determine whether the cell is the virtual cell or the normal cell.

If the virtual cell ID is defined to $N_{ID}^{(2)}=3$ for the virtual cell, then a rule for configuring the cell ID can be modified. For example, if $N_{ID}^{(2)}$ has a value between 0 to 2, $N_{ID}^{cell}=3N_{ID}^{(1)}+N_{ID}^{(2)}$. However, if $N_{ID}^{(2)}$ has any one of values 0 to 3, then it can be modified to $N_{ID}^{cell}=4N_{ID}^{(1)}+N_{ID}^{(2)}$. As such, the direct modification method may result in generation of a range in which a virtual cell ID range overlaps with the conventional cell ID range. Therefore, the virtual cell ID range can be configured such that it does not overlap with the conventional cell ID range. For example, the virtual cell ID can be determined to a range of Equation 17 below.

$$N_{ID}^{cell} = \begin{cases} 3N_{ID}^{(1)} + N_{ID}^{(2)}, & \text{if } N_{ID}^{(2)} \in \{0, 1, 2\} \\ N_{ID}^{(1)} + 504, & \text{if } N_{ID}^{(2)} = 3 \end{cases}$$ [Equation 17]

In Equation 17 above, the virtual cell can have any one value in the range of 504 to 671. In this case, in order to regulate signaling overhead, the range of $N_{ID}^{(1)}$ can be set differently from the conventional range, i.e., the range of 0 to 167, only for a case of $N_{ID}^{(2)}=3$.

The method described with reference to FIG. 17 can also be applied to IEEE 802.16. In IEEE 802.16, the virtual cell ID is defined such that n(segment ID) is 3. Unlike LTE, the cell ID is configured in a format of 256n+Idx in IEEE 802.16, and thus a method of mapping the cell ID does not have to be newly defined. This is because the range of the virtual cell ID is deviated from the conventional cell ID range. Also in this case, the range of Idx can be set differently from the conventional range (i.e., any one of values 0 to 255) only for a case of n=3 in order to decrease signaling overhead.

Figure 20:
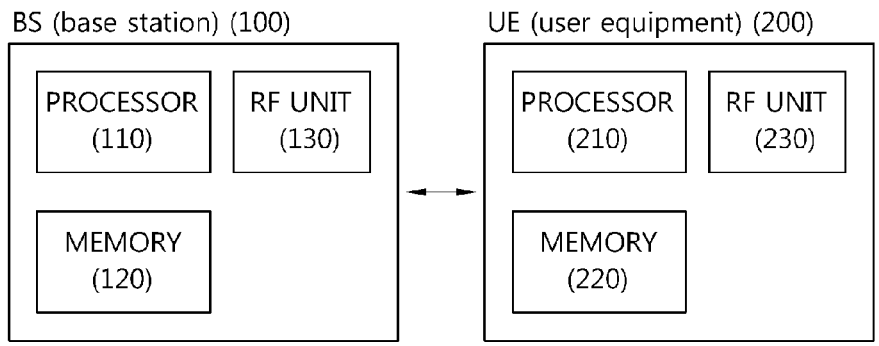
FIG. 20 is a block diagram showing a base station and a user equipment.

FIG. 20 is a block diagram showing a BS and a UE.

A BS 100 includes a processor 110, a memory 120, and a radio frequency (RF) unit 130. The processor 110 implements the proposed functions, procedures, and/or methods. That is, the processor 110 provides control so that a reference parameter is transmitted to a UE and a node-specific signal, i.e., a virtual cell specific signal, is transmitted from each node. The memory 120 is coupled to the processor 110, and stores a variety of information for driving the processor 110. The RF unit 130 is coupled to the processor 110, and transmits and/or receives a radio signal. The RF unit 130 can be configured with a plurality of nodes coupled to the BS 100 in a wired fashion.

A UE 200 includes a processor 210, a memory 220, and an RF unit 230. The processor 210 receives a reference parameter from the BS, and receives a node-specific signal from at least one node among a plurality of nodes. The node-specific signal may be the aforementioned virtual cell specific signal, e.g., a CSI-RS identifiable for each virtual cell. A virtual cell parameter required for decoding of the node-specific signal is determined based on the reference parameter. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antenna ports for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of receiving a signal of a user equipment in a multi-node system including a plurality of nodes and a base station for controlling the plurality of nodes, the method comprising:
   receiving a reference parameter from the base station;
   receiving a node-specific signal from at least one node among the plurality of nodes; and
   decoding the node-specific signal,
   wherein a virtual cell parameter required for decoding of the node-specific signal is determined based on the reference parameter, and
   wherein the node-specific signal is decoded b using each of candidates of the virtual cell parameter which is dependent on the reference parameter.

2. The method of claim 1, wherein the node-specific signal is a channel status information reference signal (CSI-RS) for measuring a channel state for the at least one node and the base station.

3. The method of claim 2,
   wherein the virtual cell parameter includes a CSI-RS configuration number and a CSI-RS subframe configuration number of the CSI-RS, and
   wherein the CSI-RS configuration number indicates a location in a subframe of a resource element to which the CSI-RS is mapped, and the CSI-RS subframe configuration number indicates a subframe in which the CSI-RS is transmitted.

4. The method of claim 3, wherein a CSI-RS subframe configuration number of the at least one node is a fixed value which is different by a specific offset from a CSI-RS subframe configuration number of the base station, and the CSI-RS configuration number of the at least one node is a value increased from the CSI-RS configuration number of the base station on the basis of an index of the at least one node.

5. The method of claim 4, wherein a CSI-RS periodicity of the at least one node is equal to a CST-RS periodicity of the base station.

6. The method of claim 3, wherein a CSI-RS configuration number of the at least one node is equal to a CSI-RS configuration number of the base station, and a CSI-RS subframe configuration number of the at least one node is a value increased based on an index of the at least one node from a CSI-RS subframe configuration number of the base station.

7. The method of claim 6, wherein a CSI-RS periodicity of the at least one node is equal to a CSI-RS periodicity of the base station.

8. The method of claim 6, wherein a CSI-RS periodicity of the at least one node is a multiple of a CSI-RS periodicity of the base station.

9. The method of claim 1, wherein if the node-specific signal is a CSI-RS, an antenna port number of the CSI-RS is used by increasing the base station's antenna port number included in the reference parameter on the basis of an index of the at least one node.

10. The method of claim 1,
wherein the virtual cell parameter includes a virtual cell identifier (ID) used by the at least one node, and
wherein the virtual cell ID is partially identical to a mother cell ID used by the base station.

11. An apparatus for receiving a signal, the apparatus comprising:
a radio frequency (RF) unit comprising one or more ante orts contoured to receive a radio signal; and
a processor coupled to the RF unit,
wherein the processor is configured to process the radio signal received from a base station and from at least one node among a plurality of nodes controlled by the base station,
wherein the processor receives a reference parameter from the base station, receives a node-specific signal from the at least one node among the plurality of nodes controlled by the base station, and decodes the node-specific signal,
wherein a virtual cell parameter required for decoding of the node-specific signal is determined based on the reference parameter, and
wherein the node-specific signal is decoded by using each of candidates of the virtual cell parameter which is dependent on the reference parameter.

* * * * *